(12) United States Patent
Blesser

(10) Patent No.: US 9,245,309 B2
(45) Date of Patent: *Jan. 26, 2016

(54) FEEDBACK AND SIMULATION REGARDING DETECTABILITY OF A WATERMARK MESSAGE

(71) Applicant: The Telos Alliance, Cleveland, OH (US)

(72) Inventor: Barry Blesser, Belmont, MA (US)

(73) Assignee: THE TELOS ALLIANCE, Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/514,849

(22) Filed: Oct. 15, 2014

(65) Prior Publication Data
US 2015/0161753 A1    Jun. 11, 2015

Related U.S. Application Data

(63) Continuation of application No. 14/216,041, filed on Mar. 17, 2014, now Pat. No. 8,918,326, which is a continuation-in-part of application No. 14/163,864, filed on Jan. 24, 2014, now Pat. No. 8,768,714, which (Continued)

(51) Int. Cl.
*G06T 1/00* (2006.01)
*G10L 19/018* (2013.01)

(52) U.S. Cl.
CPC .............. *G06T 1/0021* (2013.01); *G10L 19/018* (2013.01); *G06T 2201/0065* (2013.01)

(58) Field of Classification Search
CPC ................ G10L 19/018; G10L 19/167; H04L 2209/608; G06F 2221/0733

USPC ............. 382/100; 380/203; 713/176; 340/5.6
See application file for complete search history.

(56) References Cited

U.S. PATENT DOCUMENTS

| | | | |
|---|---|---|---|
| 5,029,217 | A | 7/1991 | Chabries et al. |
| 5,450,490 | A | 9/1995 | Jensen et al. |
| 5,483,276 | A | 1/1996 | Brooks et al. |

(Continued)

FOREIGN PATENT DOCUMENTS

WO    2006/116270    11/2006

OTHER PUBLICATIONS

Arbitron, Critical Band Encoding Technology Audio Encoding System From Arbitron; Document 1050-1054; Revision E; pp. 1-27; Feb. 2008.

(Continued)

*Primary Examiner* — Vu Le
*Assistant Examiner* — Kenny Cese
(74) *Attorney, Agent, or Firm* — Renner, Otto, Boisselle & Sklar, LLP.

(57) ABSTRACT

Providing feedback regarding potential detectability by a decoder of a watermark message produced by a watermarking encoder includes receiving a watermark detectability indication that does not directly correspond to detectability of the watermark message by the decoder but is only a proxy for detectability of the watermark message by the decoder, transforming the watermark detectability indication into an enhancement indication corresponding to a prescribed enhancement to a watermark signal in which the watermark message is embedded based on the watermark detectability indication, and transmitting the enhancement indication to enhance the watermark signal thereby enhancing detectability of the watermark message.

16 Claims, 34 Drawing Sheets

Related U.S. Application Data is a continuation-in-part of application No. 14/145,681, filed on Dec. 31, 2013, now Pat. No. 8,768,710, which is a continuation-in-part of application No. 14/097,716, filed on Dec. 5, 2013, now Pat. No. 8,768,005.

(56) References Cited

U.S. PATENT DOCUMENTS

| | | | |
|---|---|---|---|
| 5,574,962 A | 11/1996 | Fardeau et al. | |
| 5,579,124 A | 11/1996 | Aijala et al. | |
| 5,581,800 A | 12/1996 | Fardeau et al. | |
| 5,764,763 A | 6/1998 | Jensen et al. | |
| 5,787,334 A | 7/1998 | Fardeau et al. | |
| 6,421,445 B1 | 7/2002 | Jensen et al. | |
| 6,571,144 B1 | 5/2003 | Moses et al. | |
| 6,621,881 B2 | 9/2003 | Srinivasan | |
| 6,674,876 B1 | 1/2004 | Hannigan et al. | |
| 6,683,958 B2 | 1/2004 | Petrovic | |
| 6,845,360 B2 | 1/2005 | Jensen et al. | |
| 6,862,355 B2 | 3/2005 | Kolessar et al. | |
| 6,871,180 B1 | 3/2005 | Neuhauser et al. | |
| 6,996,237 B2 | 2/2006 | Jensen et al. | |
| 7,031,491 B1 | 4/2006 | Donescu et al. | |
| 7,222,071 B2 | 5/2007 | Neuhauser et al. | |
| 7,239,981 B2 | 7/2007 | Kolessar et al. | |
| 7,316,025 B1 | 1/2008 | Aijala et al. | |
| 7,395,211 B2 | 7/2008 | Watson et al. | |
| 7,471,987 B2 | 12/2008 | Crystal et al. | |
| 7,483,835 B2 | 1/2009 | Neuhauser et al. | |
| 7,483,975 B2 | 1/2009 | Kolessar et al. | |
| 7,640,141 B2 | 12/2009 | Kolessar et al. | |
| 7,961,881 B2 | 6/2011 | Jensen et al. | |
| RE42,627 E | 8/2011 | Neuhauser et al. | |
| 8,099,285 B2 | 1/2012 | Smith et al. | |
| 8,918,326 B1* | 12/2014 | Blesser | 704/500 |
| 2003/0128861 A1 | 7/2003 | Rhoads | |
| 2003/0219143 A1 | 11/2003 | Moskowitz et al. | |
| 2003/0231785 A1 | 12/2003 | Rhoads et al. | |
| 2005/0157907 A1 | 7/2005 | Reed et al. | |
| 2005/0240768 A1* | 10/2005 | Lemma | G06T 1/005 713/176 |
| 2008/0275697 A1 | 11/2008 | Kentish et al. | |
| 2009/0262932 A1 | 10/2009 | Petrovic | |
| 2010/0057231 A1* | 3/2010 | Slater et al. | 700/94 |
| 2011/0093104 A1 | 4/2011 | Blesser | |
| 2012/0274459 A1 | 11/2012 | Jaisimha et al. | |
| 2014/0142958 A1* | 5/2014 | Sharma | G10L 19/018 704/500 |

OTHER PUBLICATIONS

Blesser, Barry, Director of Engineering, 25-Seven Systems, Inc.; Technical Properties of Arbitron's PPM System; pp. 1-8; Aug. 18, 2009.

Non-Final Office Action dated Jan. 24, 2014 for U.S. Appl. No. 14/097,716.

Non-Final Office Action dated Feb. 20, 2014 for U.S. Appl. No. 14/145,681.

Non-Final Office Action dated Aug. 11, 2014 for U.S. Appl. No. 14/216,041.

International Search Report and Written Opinion dated Mar. 13, 2015 for corresponding International Application No. PCT/US2014/068485.

* cited by examiner

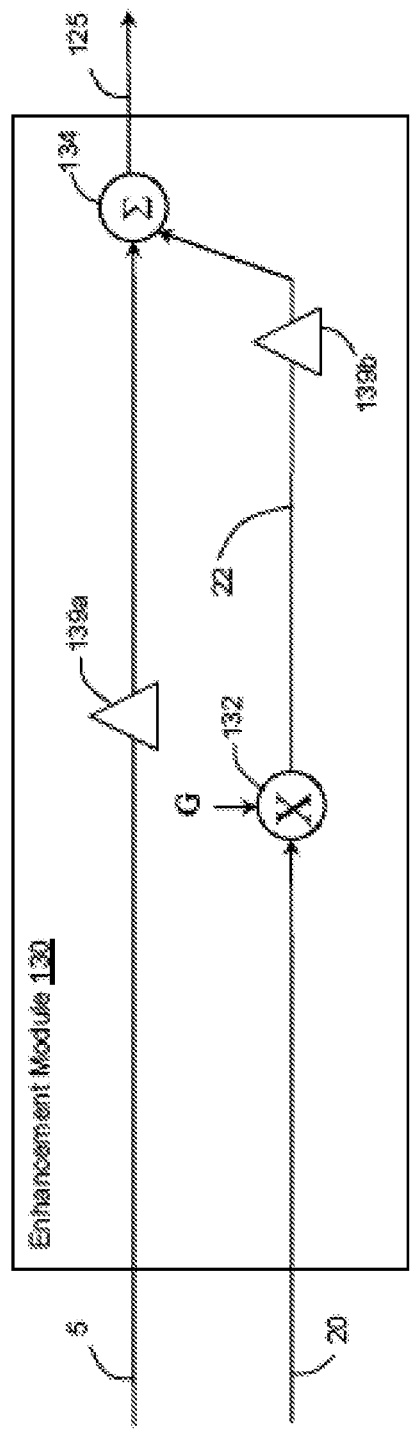

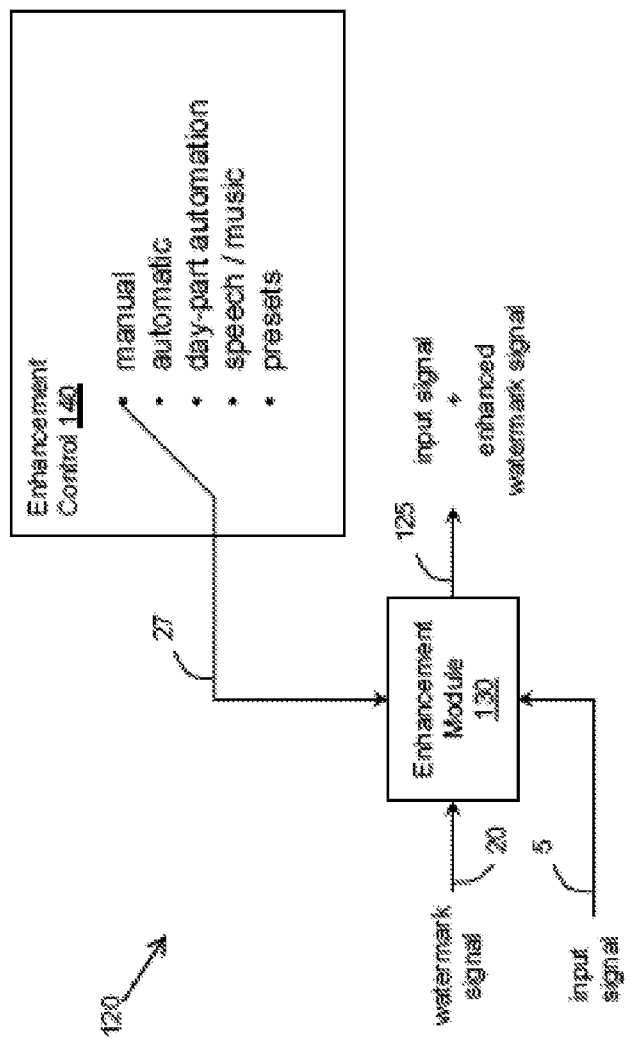

FEEDBACK AND SIMULATION REGARDING DETECTABILITY OF A WATERMARK MESSAGE

FIELD OF THE INVENTION

The present disclosure relates to audio processing. More particularly, the present disclosure relates to methods and systems for providing feedback regarding detectability of a watermark message produced by a watermarking encoder.

BACKGROUND

An audio watermark is a type of digital watermark—a marker embedded in an audio signal. Audio watermarking is the process of embedding information in audio signals. To embed this information the original audio may be changed or new components may be added to the original audio. Watermarking applications include embedding audio sound samples with digital information about its ownership, distribution method, transmission time, performer, producer, legal status, etc.

In order to embed the digital bits that make up the identification code, watermarking modifies the original audio by adding new content or changing existing audio components. The ideal audio watermarking system is 100% reliable in terms of embedding and extracting the watermarking data in all "typical" listener scenarios while remaining 100% inaudible for all "typical" program material. These goals underscore a paradox: 100% encoding reliability likely requires audible watermarks. Conversely, to achieve total inaudibility, watermarks cannot be present at all on some material, which clearly sacrifices reliability. Trade-offs must always be made in audio watermarking systems to balance audibility and reliability.

The Portable People Meter™ (PPM™) system by The Arbitron Company is an example of a watermarking system. The Arbitron PPM system embeds watermarks with station identification codes into the audio program at the time of broadcast using an encoder in each individual radio station's transmission chain. Portable PPM decoders then identify which stations the wearers of the decoders or "people meters" are listening to.

A watermarking technology that is used to track listeners of radio programs such as PPM is more likely to need close to 100% reliability of data extraction even if some audio is broadcasted with modest perceptible degradation. The reason for requiring 100% reliability is that failures in reliability are not uniformly spread across the broadcast population. For example, a system that is 99% reliable over all announcers, program types, and listening devices, may have the 1% of failures concentrated in a particular radio announcer or a particular radio show or type of music from, for example, a particular cultural tradition. Listener ratings for the particular radio announcer, the particular radio show or type of music would drop, resulting in a loss of advertising revenue and the eventual cancellation of the affected programming. Clearly, large amounts of money are at stake on reliability.

Therefore, ensuring that audio leaving the station is optimized for successful watermarking encoding/decoding is important. There is a need for a system that individual radio broadcasters, the originators of the terrestrial signal, can utilize to control the trade-off between higher reliability of watermark decoding and higher audible degradation.

A first step towards more control of these trade-offs may be to extract the watermark signal from the output of the encoder such that analysis may be conducted to better understand the effects of watermarking and perhaps control them to the broadcaster's benefit.

One potential approach to extracting the watermark signal would be to attempt to simply subtract the input of the watermarking encoder from its output to obtain the watermark signal. This approach, however, is ineffective because the watermarking encoder introduces changes between the input and output signals that make simple subtraction inaccurate to the point that it is useless.

An approach for compensating for the changes through the encoder to allow for accurate subtraction may be based on a class of technology called adaptive filters. This technology iteratively finds the coefficients of the optimum filter that minimizes the difference between a) the input to the encoder as compensated by the filter and b) the actual encoder output. This approach, however, is also ineffective for several reasons. First, the encoding process involves more than just a change in gain and delay because it also adds the watermarking signal which is unknown and time-varying over a potentially large part of the spectrum. A filter cannot fully compensate for these changes. Second, the convergence of the adaptive filter to an optimum depends very strongly on the spectrum of the input signal, which is also unknown and rapidly changing. As a result, the optimization may produce only small errors between input and output, but small components at some frequencies may be more important than larger components at other frequencies. Therefore, adaptive filters, which are well known in the art, would not solve the problem.

A more nuanced approach would be to understand and compensate for the internals of the watermarking encoder to account for the changes between the input and output signals. This approach, however, is impractical at least because a) the internals of the watermarking encoders are not well understood by people other than the manufacturers of the encoders and, perhaps more importantly, b) a watermark extracting system should ideally be able to extract the watermark independently of the internals of any particular implementation of watermarking by a particular encoder.

Even if the watermark could be successfully extracted, conventionally there was no way to control the trade-off between higher reliability of watermark decoding and higher audible degradation. Moreover, conventionally there was no way to account for degradation of the watermarked signal caused in the "real world" by the listener's environment when determining the proper trade-off.

SUMMARY OF THE INVENTION

The present disclosure provides devices and method to be used in conjunction with an existing watermarking encoder that was designed, owned, or licensed by a third party to effectively extract the watermarking signal from the output of the encoder. Typically, the encoder is provided to a user such as a radio station and the station supplies the input audio program which is to be watermarked to the encoder. The station then uses the output audio program after watermarking to feed a transmitter or Internet distribution system. Because the properties of the encoder are unchangeable and likely unknown to the user, the present disclosure provides means to extract the watermark without having access to the encoder's specific internal operations.

Once the watermark signal has been extracted, it may be amplified, filtered or otherwise enhanced and then combined with the input signal to produce a new, enhanced watermarked output signal to be broadcasted or otherwise transmitted. In a sense, the encoder may be used as a watermark signal generator and the watermark signal may then be extracted, enhanced and injected back into the signal to be broadcasted or otherwise transmitted to increase the odds that the watermark may be detected and decoded by the decoder.

The present disclosure also describes systems and methods that provide more control of the trade-offs between higher reliability of watermark decoding and higher audible degradation by providing users with the ability to monitor the watermark message to make it possible to more intelligently apply any enhancements to the watermark signal.

The present disclosure further describes systems and methods that provide feedback such that any enhancements may be based on the monitoring of the watermark signal in a real or simulated environment, and, moreover, such that any enhancements account for degradation of the watermarked signal caused in the "real world" by the listener's environment.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 8 illustrates a detailed block diagram of an exemplary enhancement module.

FIG. 10 illustrates a block diagram of a portion of the system for enhancing a watermark signal extracted from an output signal of a watermarking encoder of FIG. 7 that includes the enhancement module and an enhancement control module.

DETAILED DESCRIPTION

Although the present disclosure describes various embodiments in the context of watermarking station identification codes into the station audio programming to identify which stations people are listening to, it will be appreciated that this exemplary context is only one of many potential applications in which aspects of the disclosed systems and methods may be used.

Figure 1:
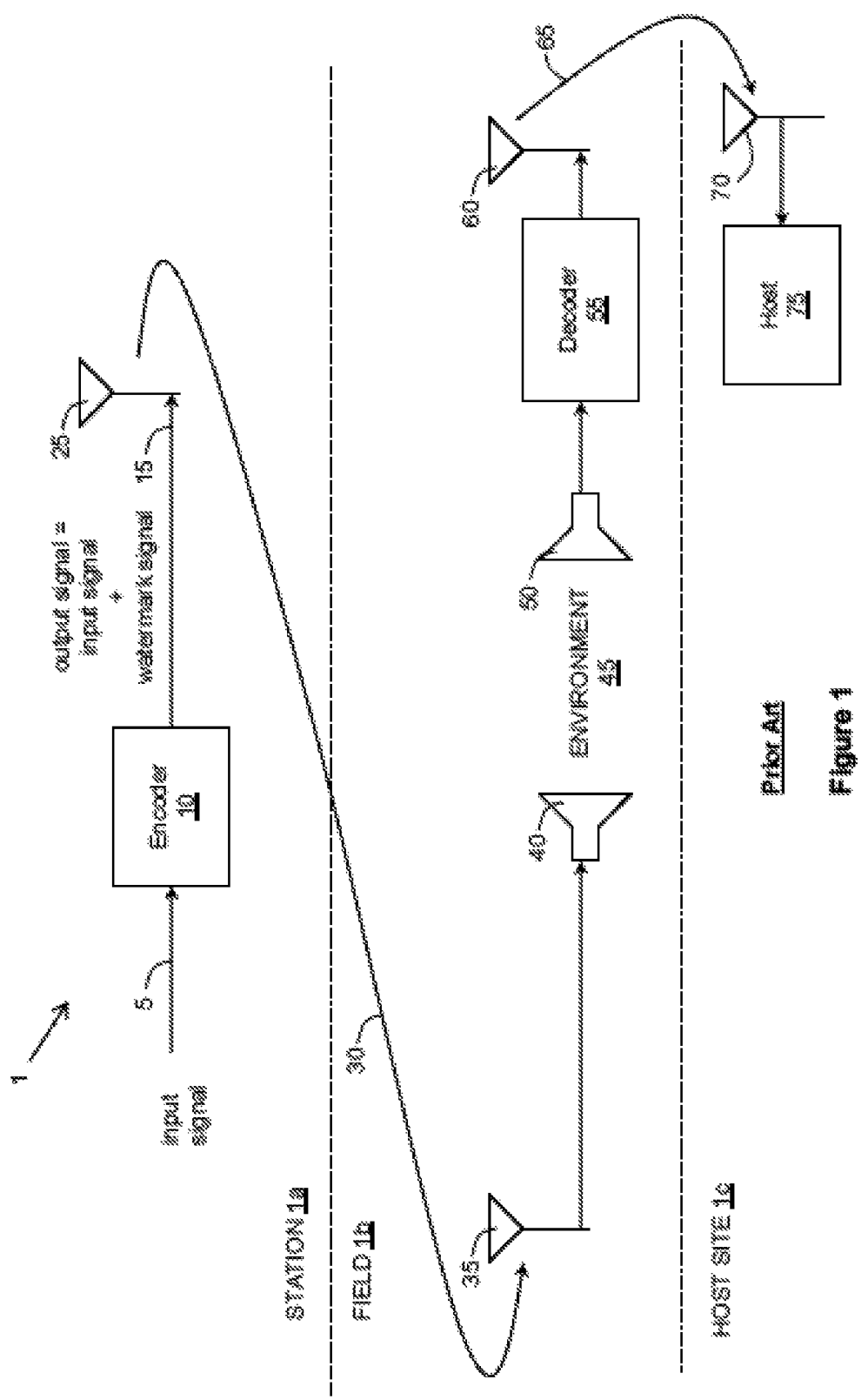
FIG. 1 illustrates a simplified block diagram of an exemplary prior art system for electronic watermarking.

FIG. 1 illustrates a simplified block diagram of an exemplary prior art system 1 for electronic watermarking. The system 1 includes at least two portions, a portion at the station 1a and a portion at the field 1b. The station 1a corresponds to the facilities where broadcasting takes place. The field 1b corresponds to the places where listeners listen to the broadcast. The field 1b could be a home, place of work, car, etc.

The main component of the watermarking system 1 at the station 1a is the watermarking encoder 10. One example of a watermarking encoder 10 is the encoder that forms part of the Portable People Meter™ (PPM™) system by The Arbitron Company. The encoder 10 receives the input signal 5 which is the source signal that the station intends to broadcast. The encoder 10 receives and watermarks the input signal 5. That is, the encoder 10 receives the input signal 5 and embeds watermarks with station identification codes onto the audio program in the input signal 5. The result is the output signal 15, which includes the information in the input signal 5 (or at least most of the information in the input signal 5) and the watermark signal 20. The modulator/transmitter 25 at the station 1a broadcasts the transmission 30, which includes the information in the output signal 15, through the air, internet, satellite, etc.

In the field 1b the receiver/demodulator 35 receives and demodulates the broadcast transmission 30 and transmits a corresponding signal to be transduced by the loudspeaker 40 into the environment 45. The combination of the receiver/demodulator 35 and the loudspeaker 40 could be, for example, an AM/FM radio. The environment 45 may vary with the field 1b (e.g., home, place of work, car, etc.), the time of day (e.g., high traffic, low traffic), etc.

The transducer 50 (e.g., a microphone) receives the output of the loudspeaker 40 as modified by the environment 45 and transmits a corresponding signal to a decoder 55. The decoder 55 decodes the received signal to, hopefully, obtain the watermark or the information within the watermark. The transmitter 60 may then transmit any detected watermark or the information within the watermark. The output of the decoder 55 and the signal 65 transmitted by the transmitter 60 include decoded information to be transported to a host 75 at a host site 1c who is managing the watermarking system to identify the station to which the user at the field 1b is listening. Although the transmitter 60 and the receiver 70 are shown as antennae in FIG. 1, transportation of the decoded information 65 may not be a broadcast but may be instead a private communication via telephone, internet, email module, etc.

As described above, ensuring that the audio signal 30 broadcasted by the station 1a is optimized for successful watermark decoding in the field 1b is important. There is a need for a system that radio broadcasters, for example, may utilize to shift the trade-off between audible signal degradation due to the watermarking and reliability of watermark extraction. Extracting the watermark signal 20 from the output signal 15 of the encoder 10 may be helpful to analyze and better understand the watermarking process, and perhaps attempt to control it to the broadcaster's benefit.

As described above, simply subtracting the input of the watermarking encoder 10 from its output to obtain the watermark signal 20 is ineffective because the watermarking encoder 10 introduces effects such as delay, gain variations, frequency or phase changes, etc. between the input and output signals. Moreover, an ideal watermark extracting system would be able to extract the watermark independently of the internals of any particular encoder.

Extraction

Figure 2:
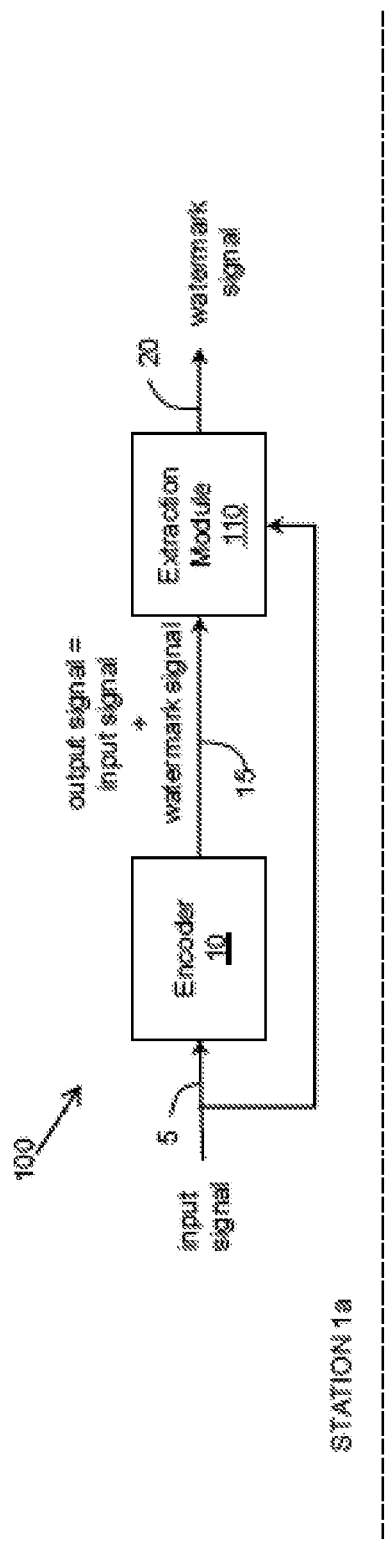
FIG. 2 illustrates a simplified block diagram of an exemplary system for audio watermark extraction.

FIG. 2 illustrates a simplified block diagram of an exemplary system 100 for audio watermark extraction. The system 100 includes the encoder 10 as described above and an extraction module 110. The extraction module 110 receives the input signal 5 and the output signal 15. From manipulation of those signals the extraction module 110 effectively extracts the watermark signal 20. Thus, the extraction module 110 compensates for changes in the input signal portion of the output signal 15 introduced by the watermarking encoder 10 substantially without regard to the internals of the specific encoder 10.

Figure 3:
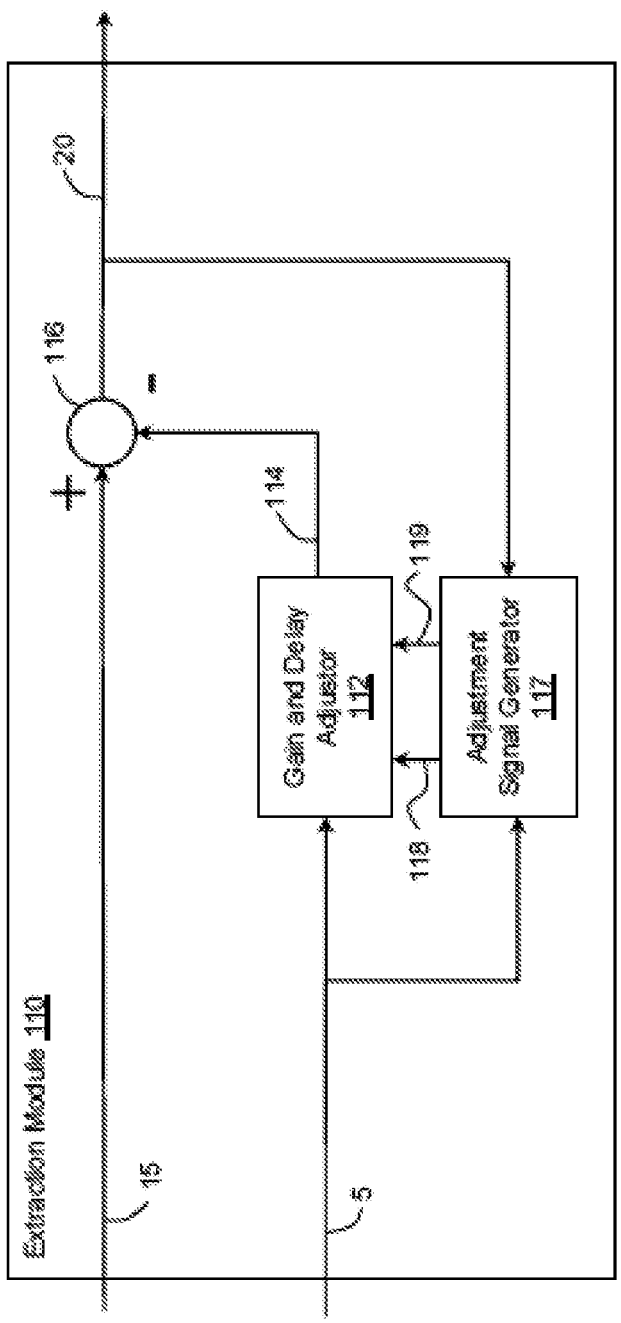
FIG. 3 illustrates a simplified block diagram of an exemplary watermark extraction module for extracting a watermark signal from an output signal of a watermarking encoder.

FIG. 3 illustrates a simplified block diagram of an exemplary watermark extraction module 110 for extracting a watermark signal 20 from an output signal 15 of a watermarking encoder 10. The extraction module 110 receives the input signal 5 and the output signal 15.

The extraction module 110 includes a gain and delay adjustor 112. The adjustor 112 receives the input signal 5 and adjusts its gain and delay to match the gain and delay of the output signal 15 created by the encoder 10. The output of the adjustor 112 is the adjusted input signal 114 which corresponds to the input signal 5 adjusted to compensate for changes in gain and delay in the output signal 15 introduced by the watermarking encoder 10.

The extraction module 110 also includes a subtractor 116 that subtracts the adjusted input signal 114 from the output signal 15 to obtain the watermark signal 20.

The extraction module 110 further includes an adjustment signal generator 117 that receives the input signal 5 and the watermark signal 20 to generate a gain adjustment signal 118 and a delay adjustment signal 119 based on the received signals. The adjustor 112 receives the gain adjustment signal 118 and the delay adjustment signal 119 in addition to the input signal 5, and adjusts gain and delay of the input signal 5 based on the gain adjustment signal 118 and the delay adjustment signal 119, respectively, to generate the adjusted input signal 114.

The extraction module 110 outputs the difference between the output signal 15 and the adjusted input signal 114 as the watermark signal 20.

In another embodiment (not shown), the adjustor 112 may receive the output signal 15 and adjust its gain and instead of adjusting the gain and delay of the input signal 5. In this embodiment, the output of the adjustor 112 is an adjusted output signal which corresponds to the output signal 15 adjusted to compensate for changes in gain and delay introduced by the watermarking encoder 10. The subtractor 116 may then subtract the input signal from the adjusted output signal to obtain the watermark signal. In this embodiment, the extraction module 110 may include a delay block to delay the input signal 5 before it is input to the encoder 10 to allow time for adjusting gain and delay of the output signal 15. The delayed input signal 5 may be applied to the adjustment signal generator 117 and the input signal 5 to the encoder 10 or viceversa. The adjustment signal generator 117 receives the input signal 5 and the signal 20 to generate a gain adjustment signal and a delay adjustment signal based on the received signals. The adjustor 112 receives the gain adjustment signal 118 and the delay adjustment signal 119 in addition to the output signal 15, and adjusts gain and delay of the output signal 15 based on the gain adjustment signal 118 and the delay adjustment signal 119, respectively, to generate the adjusted output signal. In this embodiment, the adjustor 112 may also compensate for the delay introduced in the input signal 5 by the delay block. The extraction module 110 outputs the difference between the adjusted output signal and the input signal as the watermark signal 20.

Figure 4:
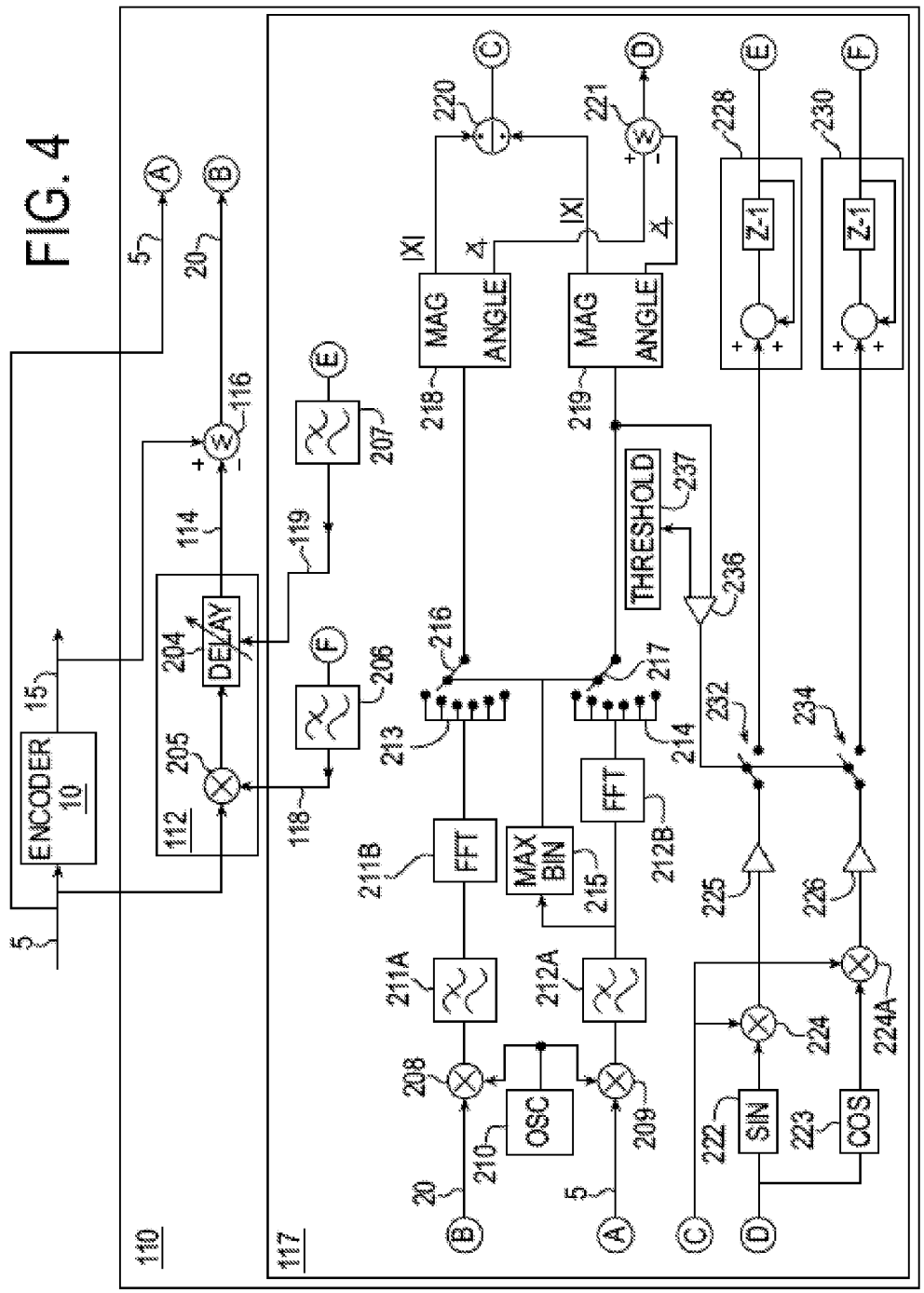
FIG. 4 illustrates a detailed block diagram of the exemplary watermark extraction module for extracting a watermark signal from an output signal of a watermarking encoder.

FIG. 4 illustrates a detailed block diagram of an exemplary watermark extraction module 110 for extracting a watermark signal 20 from an output signal 15 of a watermarking encoder 10. As described above, the extraction module 110 includes the gain and delay adjust 112, and the adjustment signal generator 117 that receives the input signal 5 and the watermark signal 20 and generates a gain adjustment signal 118 and a delay adjustment signal 119 to provide to the adjustor 112. The adjustor 112 receives the gain adjustment signal 118 and the delay adjustment signal 119 in addition to the input signal 5, and adjusts gain and delay of the input signal 5 based on the gain adjustment signal 118 and the delay adjustment signal 119, respectively, to generate the adjusted input signal 114. The subtractor 116 subtracts the adjusted input signal 114 from the output signal 15 to obtain the watermark signal 20.

As described in more detail below, in one embodiment (not shown) the adjustment signal generator 117 operates in multiple spectral regions such that the operation of generating the gain adjustment signal 118 and the delay adjustment signal 119 is performed multiple times (e.g., in parallel), at least once for each of the multiple spectral regions. For example, the adjustment signal generator 117 may generate a first gain adjustment signal and a first delay adjustment signal corresponding to frequencies from 0 to 500 Hz and a second gain adjustment signal and a second delay adjustment signal corresponding to frequencies from 500 to 1000 Hz, and so on. The exemplary illustration of FIG. 4 assumes that the encoder 10 may be modeled as a single gain and a single delay. To achieve better performance, however, if needed or if that assumption is not valid, the adjustment signal generator 117 may generate a gain adjustment signal and a delay adjustment signal for each of the multiple spectral regions or frequency ranges.

In the illustrated embodiment of FIG. 4, the gain and delay adjustor 112 includes a variable delay 204 and a multiplier 205. The multiplier 205 receives the gain adjustment signal 118 while the variable delay 204 receives the delay adjustment signal 119 from the adjustment signal generator 117.

The feedback in the adjustment signal generator 117 varies the gain and delay adjustments signals 118 and 119 to adjust gain and delay of the input signal 5 such that, at frequencies of the input signal 5 at which the encoder 10 is not likely to embed a watermark, the difference between the output signal 15 and the adjusted input signal 114 (i.e., the signal 20) is zero. That is, at frequencies of the output signal 15 at which the encoder 10 does not embed a watermark, energy in the signal 20 is attributed to error in the subtraction. At frequencies of the output signal 15 at which the encoder 10 does not embed a watermark, any difference between the input signal 5 and the input signal portion of the output signal 15 is fully attributable to effects introduced by the encoder 10 and not to any watermarking. If the gain and delay adjustments signals 118 and 119 matched the actual properties of the encoder 10, the signal 20 would be zero. The feedback loop of the adjustment signal generator 117 continuously adjusts the gain and delay adjustments signals 118 and 119 until the error at these frequencies is approximately zero.

At least during acquisition of the gain and delay adjustments signals 118 and 119 (e.g., calibration), the watermark extraction module 110 operates under the assumption that the input signal 5 is of a nature (e.g., spectral characteristics) that does not cause the encoder 10 to embed a watermark. Therefore, in the acquisition of the gain and delay adjustments signals 118 and 119 the signal 20 does not include a watermark. In the acquisition of the gain and delay adjustments signals 118 and 119 the signal 20 corresponds to an error signal that represents the difference between the output signal 15 and the adjusted input signal 114. In contrast, outside of the acquisition of the gain and delay adjustments signals 118 and 119 the signal 20 corresponds to the watermark embedded by the encoder 10.

Therefore, the present disclosure refers to the signal 20 as the watermark signal 20 or the error signal 20 depending on the context. At least in the context of acquisition of the gain and delay adjustments signals 118 and 119 (e.g., in a calibration context), the signal 20 corresponds to an error signal, and thus the signal 20 is referred to as the error signal 20. Outside of acquisition of the gain and delay adjustments signals 118 and 119 (e.g., outside of the calibration context), the signal 20 corresponds to the extracted watermark, and thus the signal 20 is referred to as the watermark signal 20. The same signal, the signal 20, may have two different meanings depending on the context.

As described below, in order for the feedback loop to operate properly, it may be required that the input signal 5 includes some energy in a particular frequency (i.e., the frequency of operation of the feedback loop). The frequency of operation the feedback loop is also selected such that the feedback loop operates at a frequency at which the encoder 10 does not embed a watermark.

In the illustrated embodiment, the adjustment signal generator 117 includes multipliers 208 and 209, and a complex oscillator 210, which together function as a complex demodulator to the oscillating frequency of the oscillator 210. The complex oscillator 210 generates a complex signal $\sin(\omega t)+j\cos(\omega t)$ and the multipliers 208 and 209 multiply the error signal 20 and the input signal 5, respectively, to the complex signal. By working in the complex domain, the multiplication preserves the phase and magnitude of the error signal 20 and the input signal 5. Essentially, the components of the error signal 20 and the input signal 5 corresponding to the oscillating frequency of the oscillator 210 are moved to be centered around 0 Hz with both amplitude and phase information preserved. These vectors are then low passed filtered in 211A and 212A as complex numbers. The error signal 20 and the input signal 5 are effectively demodulated to the oscillating frequency of the oscillator 210 to become complex vectors, an input signal vector and an error signal vector, that each includes amplitude and phase information.

The fast Fourier transform (FFT) decomposition module 211B produces n input signal FFT bins and, thus, effectively produces n pairs of vectors, one pair for each FFT bin. Similarly, the FFT decomposition module 212B produces n error signal FFT bins and, thus, effectively produces n pairs of vectors, one pair for each FFT bin. The peak bin detector 215 extracts the index to the FFT bin with the highest energy in the input signal FFT bins corresponding to the input signal 5. Selectors 216 and 217 select the bin with the highest energy and the outputs from 216 and 217 are single complex vectors each with a magnitude and angle in the form of a +jb.

Magnitude and phase modules 218 and 219 convert each of the complex vectors into an equivalent pair of numbers representing magnitude and angle. Divider 220 determines the ratio of the two magnitudes. The subtractor 221 computes the phase difference between the two angles. The angle difference is the input to a sine converter 222 and a cosine converter 223. The output of the sine converter 222 is multiplied at 224 times the ratio of the magnitude of the highest energy input signal bin and the magnitude of the error signal bin corresponding to the highest energy input signal bin to obtain a phase error. The output of the cosine converter 223 is multiplied at 224a times the ratio of the magnitude of the highest energy input signal bin and the magnitude of the error signal bin corresponding to the highest energy input signal bin to obtain a gain error. The calculated gain error and phase error form a normalized error vector that represents gain and phase error of the error signal 20 relative to input signal 5.

Based on the gain error and the phase error, the gain adjustment signal 118 and the delay adjustment signal 119 may be generated. The gain and phase error are scaled in 225 and 226 which serve as the loop gain constants for the two loops. These scaled error signals are then integrated or accumulated in 228 and 230. The outputs of the accumulators or integrators 228 and 230 are low passed filtered at 206 and 207 and the output of the low pass filters 206 and 207 are the gain adjustment signal 118 and the delay adjustment signal 119 closing the feedback loop.

In summary, the error signal 20 (i.e., the watermark signal) is normalized to the input signal 5 so that the ratio is independent of the input amplitude. That normalized error signal as a complex vector is then decomposed into a gain error and a phase error to drive the two feedback loops.

In one embodiment, prior to normal operation the adjustment signal generator 117 is calibrated using a calibration signal. For example, an 800 Hz sinusoidal signal may be used as the input signal 5 as a calibration signal. In this example, the oscillator 210 may also operate at 800 Hz. Once the adjustment signal generator 117 is calibrated (i.e., the error signal 20 is zero under calibration conditions), normal operation of the extraction module 110 may resume.

In another embodiment, no calibration procedure is used. The extraction module 110 would operate effectively and is self-calibrating as long as the input signal 5 has some energy near the oscillating frequency (e.g., 50 Hz, 100 Hz, 200 Hz, 400 Hz, 800 Hz, 1000 Hz, 2000 Hz, etc.) of the complex oscillator 210. If the input signal 5 has energy near the oscillating frequency of the complex oscillator 210, the two feedback loops of the adjustment signal generator 117 operate effectively. If the input signal 5 does not have sufficient energy near the oscillating frequency of the complex oscillator 210, the two feedback loops may be suspended and the values for gain and delay adjustment signals 118 and 119 retained from the previous calculation. The feedback loops may operate whenever there is energy near the oscillating frequency of the complex oscillator 210 if the oscillating frequency of the complex oscillator 210 also corresponds to a frequency at which the encoder 10 does not generate or embed watermarks. In some embodiments, watermarking is in discrete spectral channels with no energy between those channels.

In the embodiment of FIG. 4, the adjustment signal generator 117 includes the switches 232 and 234, and the comparator 236. If the energy of the highest energy input signal bin is above a threshold 237 as determined by the comparator 236, the switches 232 234 are closed so that the integrator 230 may integrate the gain error (or the scaled gain error) to obtain the gain adjustment signal 118 and so that the integrator 228 may integrate the phase error (or the scaled phase error) to obtain the delay adjustment signal 119. If, however, the energy of the highest energy input signal bin is below the threshold 237 as determined by the comparator 236, the switches 232 and 234 are opened so that the integrators 228 and 230 may generate the gain adjustment signal 118 and the delay adjustment signal 119 as current values. In one embodiment, the threshold 237 corresponds to the energy of the remaining input signal bins. If the energy of the highest energy input signal bin is larger than the energy of the remaining input signal bins, integration proceeds. If the energy of the highest energy input signal bin is not larger than the energy of the remaining input signal bins, integration is suspended. Since the gain and delay errors are expected to be slowly changing, suspending changes in the compensation is commonly not a problem.

In the embodiment described above in reference to FIG. 4 the oscillating frequency of the oscillator 210 may be set to a value corresponding to a frequency of the output signal 15 at which the encoder 10 is not likely to embed a watermark. The oscillating frequency of the oscillator 210 is also set taking into account phase wrap. For example, if the oscillating frequency of the oscillator 210 is set to 800 Hz, the embodiment described will only work with delay errors lower than 1.25 ms. That is because 800 Hz has phase wrap at 1.25 ms and thus, if the oscillating frequency of the oscillator 210 is set at 800 Hz, the adjustment signal generator 117 cannot tell the difference between a delay of 0 ms, 1.25 ms, 2.50 ms, etc. because each of them maps to a phase of 0 at 800 Hz. If the oscillating frequency of the oscillator 210 is set instead at 300 Hz, for example, the adjustment signal generator 117 works to detect delay errors up to below 3.33 ms.

Similarly, if very high precision is required, the oscillating frequency of the oscillator 210 may be set to higher frequencies, such as for example 3.5 kHz, for very accurate fine tuning of the adjustment signal generator 117. The high frequency setting for the oscillating frequency of the oscillator 210 allows for very accurate adjustments of even very small differences in delay. However, the high frequency setting for the oscillating frequency of the oscillator 210 does not allow for adjustment of even relatively modest differences in delay because of the phase wrap (e.g., up to 0.285 ms at 3.5 kHz).

For this reason, there may be multiple target frequencies for the loop (i.e., the oscillating frequency of the oscillator 210). Lower frequencies may not provide good accuracy but they may address the phase wrap, while higher frequencies may be more accurate.

In one embodiment (not shown), the watermark extracting module 110 includes multiple adjustment signal generators such as the adjustment signal generator 117 and the watermark extracting module 110 combines the outputs of the multiple adjustment signal generators. For example, the oscillating frequency of a first oscillator 210 may be set to 800 Hz while the oscillating frequency of a second oscillator may be set to, for example, 300 Hz which would allow for larger ranges of possible delays. The multiple adjustment signal generators allow for disambiguating the conversion of phase to delay. While the phase at 800 Hz of 1.25 ms matches that of 0 ms, that will not be true at 300 Hz, for example. In another embodiment, the oscillating frequency of a second oscillator or a third oscillator may be set to, for example, 50 Hz. Similarly, for very accurate fine tuning an additional adjustment signal generator with an oscillating frequency of set at a higher frequency such as, for example, 3.5 kHz. Multiple adjustment signal generators produce multiple vectors which may then be processed in a combiner module to effectively combine their outputs and allow for very accurate fine tuning of even relatively large differences in delay. The additional complexity for using multiple frequencies may only be used in cases where necessary.

The embodiment described above in reference to FIG. 4 assumes a 2nd order behavior of the encoder 10 and thus provides a single gain and delay over the full spectrum for the gain and delay correction of the extraction module 110. In other embodiments, the delay in the encoder 10 may be assumed as a higher order system in which delay changes with frequency. In one embodiment (not shown), the delay 204 may be replaced by a variable low-pass filter to account for higher order responses of the encoder 10. The embodiment described above in reference to FIG. 4 corresponds to a 2nd order parametric feedback loop that derives correction based on the 2nd order model being used; two parameters, two loops. The extraction module 110, however, may be extended to a model with 3, 4 or more parameters. In which case, there will be additional feedback loops.

In another embodiment (not shown), the extraction module 110 divides the input signal 5 and the output signal 15 into spectral regions. The gain and delay adjustor 112 generates an adjusted input signal 114 for each of the spectral regions, and, thus, the subtractor 116 obtains the watermark/error signal 20 from differences between the output signal 15 and the adjusted input signal 114 corresponding to each of the spectral regions. In another embodiment, the extraction module 110 includes multiple adjustment signal generators such as 117, one for each spectral region of the input signal 5 and the output signal 15. The outputs of the multiple adjustment signal generators may then be combined and fed to the gain and delay adjustor 112 and thus, again, the subtractor 116 obtains the watermark/error signal 20 from differences between the output signal 15 and the adjusted input signal 114 corresponding to each of the spectral regions. When divided into spectral regions, the embodiment is effectively creating a high order parametric feedback with additional loops.

Enhancement

Once the watermark signal 20 has been extracted, it may be amplified, filtered or otherwise enhanced and then combined with the input signal 5 to produce a new, enhanced watermarked output signal to be broadcasted or otherwise transmitted. In a sense the encoder 10 may be used as a watermark signal generator and the watermark signal 20 may then be enhanced to increase the odds that it may be detected and decoded by the decoder 55.

Figure 7:
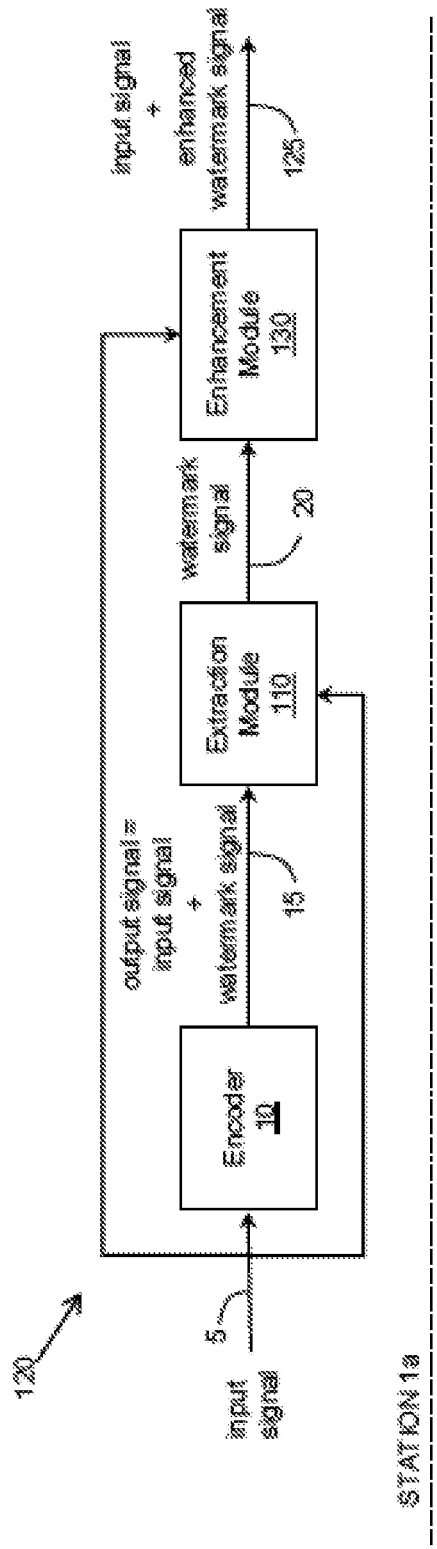
FIG. 7 illustrates a simplified block diagram of an exemplary system for enhancing a watermark signal extracted from an output signal of a watermarking encoder.

FIG. 7 illustrates a simplified block diagram for an exemplary system 120 for enhancing a watermark signal 20 extracted from an output signal 15 of a watermarking encoder 10. The system 120 includes the encoder 10, the extraction module 110 and an enhancement module 130. The encoder 10 and the extraction module 110 have been described above.

The enhancement module 130 is responsible for changing the watermark signal 20 in such a way that it is more likely to be detected by the decoder 55 in the listener's environment. In simple terms, increasing the energy of the watermark signal 20 improves its decidability by the decoder 55. There is always a trade-off, however, between decidability and audibility. A high energy watermark may be easy to decode, but may also be audible, which may be unpleasant to hear. A low energy watermark may be inaudible, but may also be difficult to decode. The enhancement module 130 makes explicit this trade-offs and provides tools to the user to set proper enhancement levels.

The enhancement module 130 receives the input signal 5 and the watermark signal 20. The enhancement module 130 enhances the watermark signal 20 at least in part by adjusting a gain of the watermark signal 20 to obtain an enhanced watermark signal 22 (shown in FIG. 8) and generate an enhanced output signal 125 including an input signal portion corresponding to the input signal 5 an enhanced watermark signal portion corresponding to the enhanced watermark signal 22.

FIG. 8 illustrates a detailed block diagram of an enhancement module 130. The enhancement module 130 includes a multiplier 132. The multiplier 132 receives a gain adjustment signal G and adjusts the watermark signal 20 based on the gain adjustment signal G to obtain the enhanced watermark signal 22. The gain adjustment signal G may be a constant set by a user, a setting adjustable by the user, a dynamic signal received from another device or system, etc. For example, the gain adjustment signal G may correspond to a fixed gain that simply increases the level of the watermark signal 20 by a fixed amount such as, for example, 6 dB. The enhancement module 130 further includes a summer 134 that sums the enhanced watermark signal 22 to the input signal 5 to obtain the enhanced output signal 125.

Figure 9A:
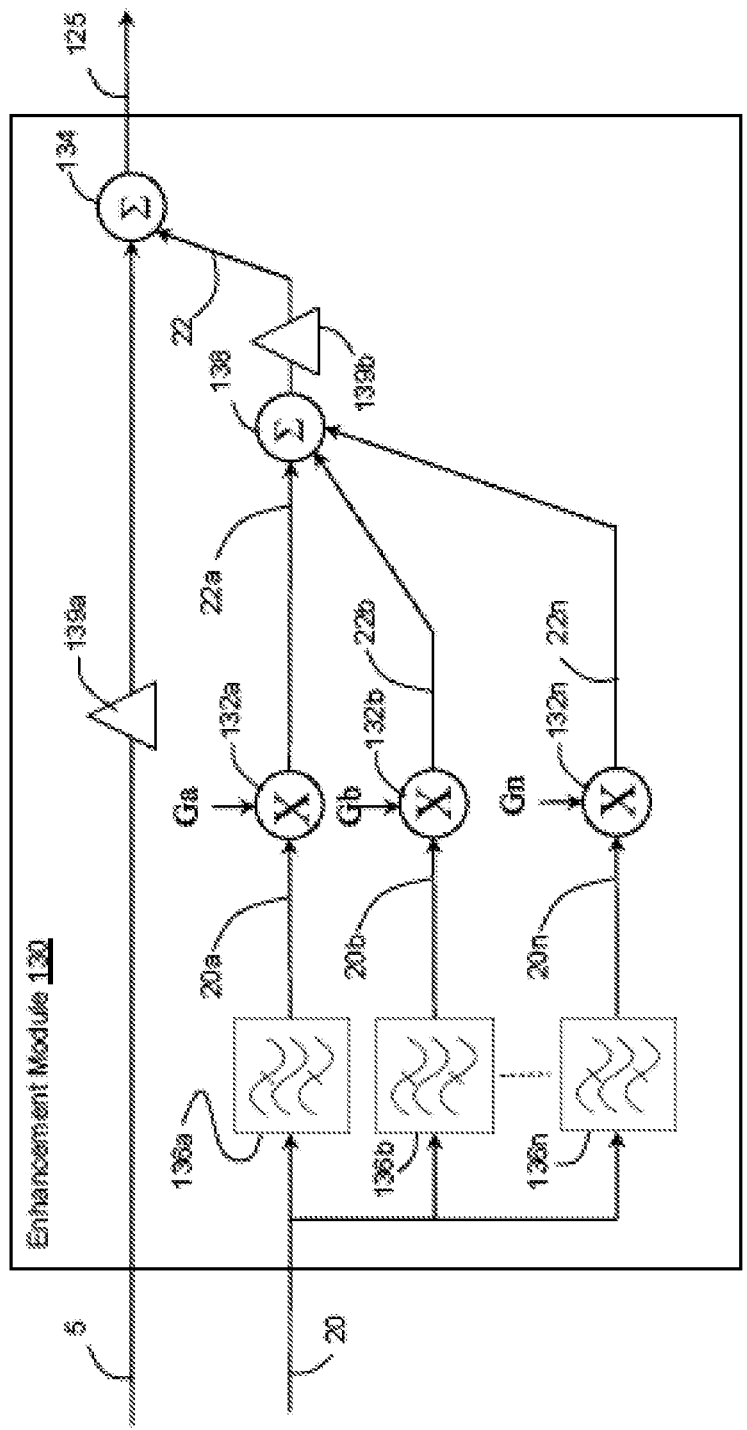
FIG. 9A illustrates a detailed block diagram of another embodiment of the exemplary enhancement module.

FIG. 9A illustrates a detailed block diagram of another embodiment of the enhancement module 130. In the embodiment of FIG. 9A, the enhancement module 130 includes a filter bank of band-pass filters 136*a-n* that receives the watermark signal 20 and divides it into spectral regions 20*a-n*. The enhancement module 130 also includes multipliers 132*a-n* that adjust gains of the spectral regions 20*a-n* of the watermark signal 20 to produce enhanced spectral regions 22*a-n*. The enhancement module 130 also includes the summer 138 that sums the enhanced spectral regions 22*a-n* to obtain the enhanced watermark signal 22. The enhancement module also includes the summer 134 that sums the enhanced watermark signal 22 to the input signal 5 to obtain the enhanced output signal 125.

The filters 136*a-n* may be band-pass filters designed so that the summer 138 may add the enhanced spectral regions 22*a-n* back together. One design approach may be to use finite impulse response (FIR) filters of the same order for each of the band-pass filters 136*a-n*. Because FIR filters have constant delay at all frequencies, the summation at summer 138 should not have any phase interference effects. For example, the shape of the filters 136*a-n* may be selected to correspond to a raised cosine such that the sum of neighboring filters is always 1.00. The shape of the filters 136*a-n* may also be selected to correspond to fast Fourier transforms (FFT), quadrature mirrors, or any other technique that preserves the ability for the enhanced spectral regions 22*a-n* to be summed at the summer 138. For watermarking technologies that involve discrete narrow band channels, the filters 136*a-n* may be relatively sharp to correspond to the narrow band channels. In one embodiment, filters are provided only for spectral regions in which the watermarking signal has energy, which may be known ahead of time.

Each of the multipliers 132*a-n* receives a respective gain adjustment signal Ga-n corresponding to a gain setting for the respective one of the spectral regions 20*a-n*. Each of the multipliers 132*a-n* adjusts the gain of the respective one of the spectral regions 20*a-n* based on the received respective one of the gain adjustment signals Ga-n to obtain the enhanced spectral regions 22*a-n*. The gain adjustment signals Ga-n may be constants set by a user, settings adjustable by the user, dynamic signals received from another device or devices or from another system or systems, etc. For example, the gain adjustment signals Ga-n may correspond to fixed gains that simply increase the level of the respective one of the spectral regions 20*a-n* by a fixed amount such as, for example, 3 dB for one spectral region, 6 dB for another spectral region, etc.

Figure 9B:
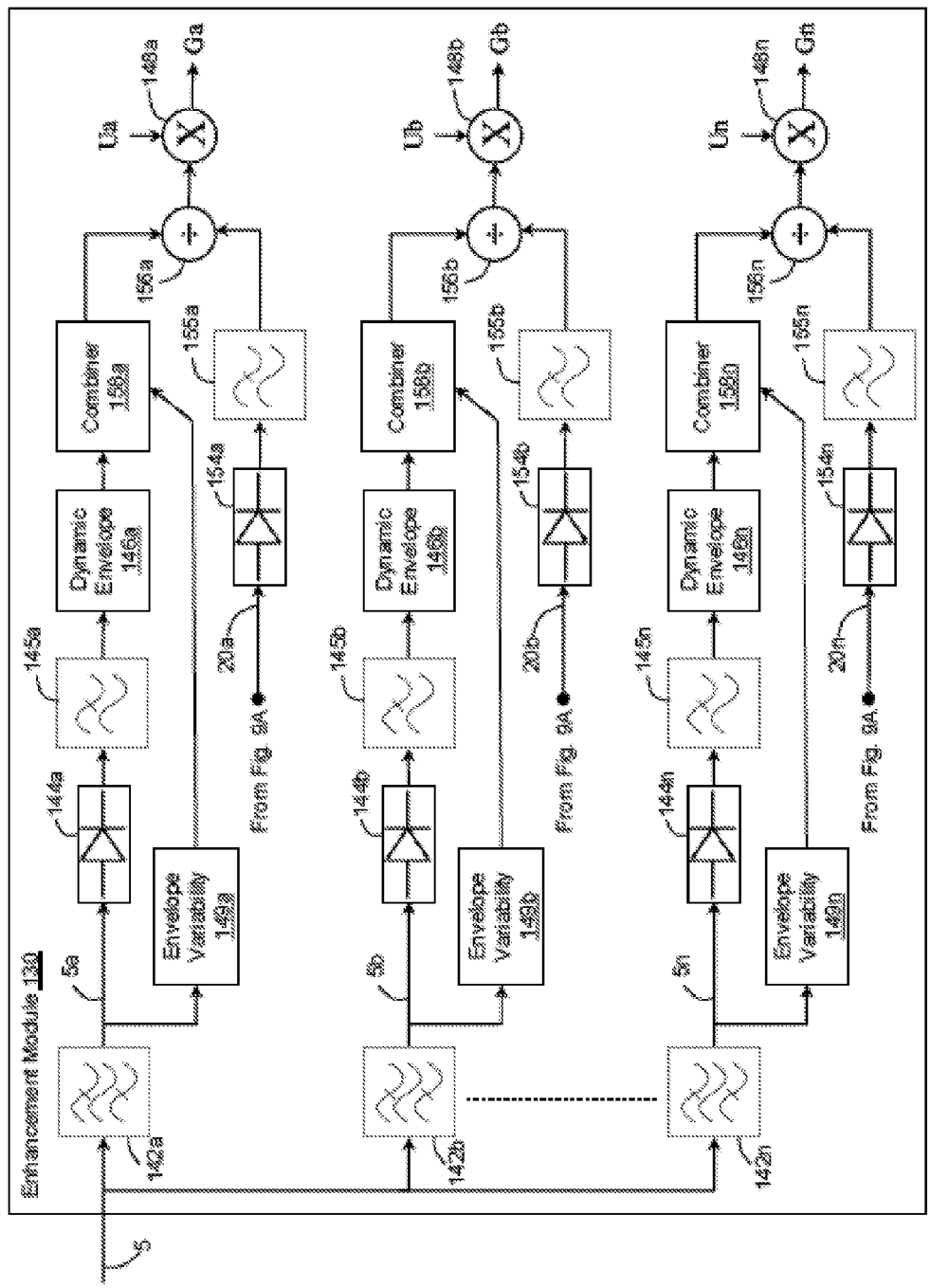
FIG. 9B illustrates a continuation or enhancement to the embodiment of the exemplary enhancement module of FIG. 9A.

FIG. 9B illustrates a continuation or enhancement to the embodiment of the enhancement module 130 of FIG. 9A—an implementation of artificial intelligence based on the masking principle. Masking is a property of the human auditory system. For example strong energy in the program audio at 1 kHz makes lower level signals at 1.05 kHz inaudible. Masking has independent forward and backward power; the filter is therefore not symmetric. Masking also varies in time. In general, a large audio component masks energy coming later more than it masks energy that has already happened. The portions of the enhancement module 130 illustrated in FIG. 9B create a model of the human detectability of a signal by incorporating forward and backward time masking, and forward and backward spectral masking.

The portions of the enhancement module 130 illustrated in FIG. 9B may be thought of as a specialized automatic gain control (AGC) designed to determine the maximum watermark signal (i.e., the masking power) in a given spectral region or watermarking channel such that the watermark signal is as large as possible within the masking dynamics. The masking power may be scaled by a user settable factor and the result fed back to the gains of each channel or spectral region in FIG. 9A. This gain allows the user to set the tradeoff between the degrees of audibility and decoding power. For example, the user may wish to be aggressive and allow the watermarking to be partially heard in exchange for strong decoding. Or the user may risk weak decoding to make sure that the watermarking is inaudible.

In FIG. 9B, the enhancement module 130 includes, in addition to the features illustrated in FIG. 9A, a filter bank of band-pass filters 142a-n configured to divide the input signal 5 into spectral regions 5a-n. The enhancement module 130 also includes mean/average calculators 144a-n, at least one mean/average calculator 144 per spectral region 5a-n. The mean/average calculators 144a-n, which may be rectifiers, calculate at least one of root mean square (RMS) or magnitude average of the respective spectral region 5a-n of the input signal 5. In one embodiment, the enhancement module 130 includes low-pass filters 145a-n that filter the outputs of the mean/average calculators 144a-n.

The enhancement module 130 may also include dynamic envelope calculators 146a-n, one per spectral region. The dynamic envelope calculators 146a-n calculate for each spectral region a dynamic envelope of the at least one of the root mean square (RMS) or the magnitude average of the spectral region of the input signal to determine a masking power of each of the spectral regions 5a-n of the input signal 5.

The combination of the filter bank of band-pass filters 142a-n, the mean/average calculators 144a-n, the low-pass filters 145a-n, and the dynamic envelope calculators 146a-n determine or at least approximate the masking power of the spectral components of the input signal 5. Because the masking power of a spectral component is not symmetric with regard to frequencies above and below the spectral component, band-pass filters 142a-n are typically not symmetric about their center frequency. Similarly, since the masking power of a spectral component that arrives earlier than the masking target is not the same as the masking power of the same spectral component arriving later than the masking target, dynamic envelopes 146a-n are also typically not symmetric. Typically, the attack and decay times are different. In other embodiments (not shown), the enhancement module 130 determines or approximates the masking power of the spectral components of the input signal 5 by methods that are similar or equivalent, but different, from the combination of the filter bank of band-pass filters 142a-n, the mean/average calculators 144a-n, the low-pass filters 145a-n, and the dynamic envelope calculators 146a-n as illustrated in FIG. 9B.

The enhancement module 130 may also include envelope variability modules 149a-n, at least one per spectral region. Because the envelope of the energy in a given spectral region of the input signal 5 (a watermark channel) may not be consistent, variability information of the spectral regions 5a-n may be used for deciding which watermark spectral region should carry the information load. The envelope variability modules 149a-n determine variability of the spectral regions 5a-n of the input signal 5.

Examples of envelopes whose variability may be determined by the modules 149a-n include, in one case, an envelope whose energy is relatively constant over a period of time and, in another case, an envelope whose energy varies significantly between peaks and valleys. For example, high frequency channels with speech are likely to be very chopped up with strong energy on fricatives and little energy on vowels. Even though masking is possible in a high frequency channel for short intervals, those intervals would be too short to allow for the embedded watermark to be decoded. In contrast, lower frequency channels with high energy on vowels may offer strong masking for hundreds of milliseconds. In this case, the user may want to enhance the lower frequency spectral regions or channels more than the higher frequency spectral regions or channels.

In one embodiment, each envelope variability module 149 determines the variability of the respective spectral region of the input signal 5 by determining whether energy of the spectral region is higher than some threshold over a period of time. The envelope variability module 149 assigns to each of the spectral regions a variability value (e.g., relative to the other spectral regions) based on how consistently energy of the spectral region of the input is higher than the threshold over the period of time. In other embodiments, the envelope variability modules 149a-n determine the variability of the respective spectral regions 5a-n of the input signal 5 by algorithms other than determining whether energy of the spectral regions is higher than some threshold over a period of time.

The enhancement module 130 includes combiners 158a-n. Each combiner 158 receives and combines the outputs of the corresponding envelope variability module 149 and dynamic envelope calculator 146. The combiners 158a-n may be gates, multiplier, etc.

The enhancement module 130 also includes envelope detectors 154a-n and smoothing filters 155a-n. Signals 20a-n from FIG. 9A represent each spectral region of the watermark signal 20 as created by the encoder 10. Energy in each spectral region of the watermark signal 20 may be too high or too low relative to the masking power of the spectral region. This means that energy in spectral regions of the watermark signal 20 as created by the encoder 10 may be a) too low and thus not optimized or b) too high and thus at least somewhat audible. Envelope detectors 154a-n and smoothing filters 155a-n, which are analogous to the mean/average calculators 144a-n and the low-pass filters 145a-n, produce an output that represents the energy of the watermark signal 20 in each spectral region to compare to the masking power of the spectral region.

The enhancement module 130 also includes dividers 156a-n, which receive the output of the combiners 158a-n and the output of the smoothing filters 155a-n. The dividers 156a-n produce a measure (i.e., the ratio of the masking power of the spectral region to the energy of the watermark signal 20 in the spectral region) to determine for each spectral region whether the energy of the watermark signal 20 as created by the encoder 10 is too high or too low. This is the basis by which later processing will decide to either increase or decrease the watermarking energy in a channel. With strong masking power relative to the watermarking energy, the watermarking energy may be increased, and vice versa.

The enhancement module 130 also includes multipliers 148a-n that combine the outputs of the dividers 156a-n and user inputs Ua-n to obtain the gain adjustment signals Ga-n. The gain adjustment signals Ga-n may be injected to the multipliers 132a-n (see FIG. 9A) to adjust gains of the spectral regions 20a-n of the watermark signal 20. This produces spectral regions 22a-n of the watermark signal that are enhanced based on the determined masking powers of each of the spectral regions 5a-n of the input signal 5, the variability of the spectral regions 5a-n of the input signal 5, and the user settable gain adjustment signals Ua-n.

For example, an audio program in input signal 5 may have energy at 1.3 kHz that can create some masking of the watermarking signal 20 in the region of 1.00 to 1.05 kHz. But the audio program may have energy at 1.2 kHz that can create more masking for those frequencies of the watermark signal 20. Mean/average calculators 144a-n and smoothing filters 145a-n together create a smooth approximation of the masking power of the input signal 5 for each spectral region. Similarly, envelope detectors 154a-n and smoothing filters 155a-n create a smooth approximation of the energy of the watermarking signal 20 in the corresponding spectral region. Because masking has a temporal dynamic, with more masking for future signals, a dynamic envelop process 146a-n accounts for the asymmetry between forward and backward time masking. A peak hold with settable attack and settable decay is an example of an implementation of such a process. Divider 160 computes the ratio of masking power of the input signal 5 to the energy of the watermarking signal 20 for respective spectral regions. If more masking power is available in a spectral region of input signal 5, the amplitude of the watermarking signal 20 in this spectral region may be increased. Similarly, if the masking power is insufficient, the amplitude of the watermark signal 20 may be decreased. A control variable from the user (Ua-n) determines the degree to which the user wishes to bias the masking algorithm.

Returning to FIGS. 8 and 9A, the enhancement module 130 may also include delays 139a and 139b that may be used to achieve a time "look ahead" or "look behind" function. The enhanced watermark signal 22 is eventually added back to the input signal 5 to produce the enhanced output signal 125. The delays 139a and/or 139b, as well as additional delays not describe herein, may be added to the design to, for example, allow the artificial intelligence as described in FIGS. 9A and 9B above to have predictive ability. Knowing what will be coming is often useful in making a decision about how much enhancement to provide.

FIG. 10 illustrates a block diagram of a portion of the system 120 that includes the enhancement module 130 and an enhancement control module 140. The kind and amount of enhancement that the enhancement module 130 provides to the watermark signal 20 may be set by operation of the enhancement control module 140.

In one embodiment, the kind and amount of enhancement may be set, as described above in reference to FIG. 8, manually by a user, as for example, a fixed boost of 6 dB. In another embodiment, as described above in reference to FIG. 9A, boosting of the watermark signal 20 may be manually set to vary by frequency with some spectral regions of the watermark signal 20 boosted to different levels than other spectral regions.

In other embodiments, enhancement of the watermark signal 20 may be automatically or dynamically controlled. In one example, a feedback measurement of the enhanced output signal 125 may be used to automatically or dynamically control the enhancement module 130 in response to the feedback measurement of the enhanced output signal 125. In another example, enhancement of the watermark signal may be automatically or dynamically controlled by a masking model such as that described above in reference to FIG. 9B above that has the intelligence to know how much boosting can be tolerated without creating an audibly unpleasant result.

In yet other embodiments, enhancement of the watermark signal 20 may be optimized for particular kinds of programs. For example, the enhancement control module 140 may instruct the enhancement module 130 to adjust the gain of the watermark signal 20 in a particular manner if the programming is speech intensive, while the enhancement control module 140 may instruct the enhancement module 130 to adjust the gain of the watermark signal 20 in a different manner if the programming is music intensive, sports, etc.

In another embodiment, the enhancement control module 140 may be set such that station automation information including information about scheduled programming (e.g., speech intensive programming, music intensive programming, sports, etc.) controls the enhancement module 130 and thus enhancement of the watermark signal 20. The prescribed enhancement indication 27 may be based on a model corresponding to the program. For a given radio station there might be a number of models such as, for example, male announcer, female announcer, hard-rock music, folk music, classical music, etc. Each of these models may have subtypes such as, for example, male announcer/talk show, male announcer/basketball game, etc. Each subtype may have its own optimum enhancer gain.

Monitoring

Although the encoder 10 may embed watermarks and the enhancement module 130 may enhance them, the watermark may still not be detectable in the field 1b by the decoder 55 (see FIG. 1). The audio program and sounds in the field 1b environment may obscure the watermark to a degree that makes it useless. If the user could monitor the watermark and/or the result of his selected enhancement, he could make his own trade-offs between audibility and reliability of detection. Monitoring the output signal 15, for example, may tell the user if enhancement is necessary. Similarly, monitoring the enhanced output signal 125 may tell the user if the enhancement provided is sufficient.

Figure 15:
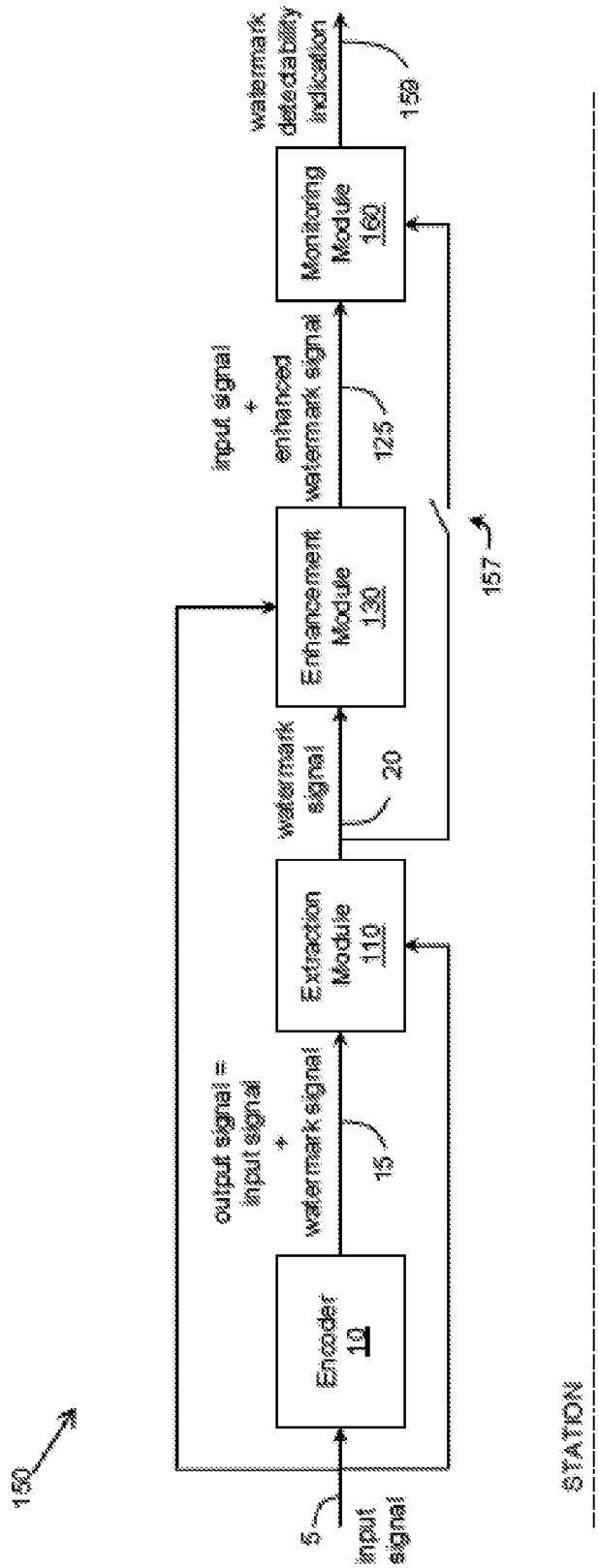
FIG. 15 illustrates a simplified block diagram of an exemplary system for monitoring detectability of a watermark message.

FIG. 15 illustrates a simplified block diagram for an exemplary system 150 for monitoring the enhanced output signal 125, which has embedded therein the watermark message. The system 150 includes the encoder 10, the extraction module 110, the enhancement module 130 and a monitoring module 160. The encoder 10, the extraction module 110 and the enhancement module 130 have been described above. The monitoring module 160 receives the enhanced output signal 125 and outputs a watermark detectability indication 159.

Although FIG. 15 illustrates the monitoring module 160 as monitoring the enhanced output signal 125, which is the output of the enhancement module 130, the monitoring module 160 may monitor any other signals that include a watermark signal portion, enhanced or not. For example, the monitoring module 160 may monitor the output signal 15, which is the output of the encoder 10, or the watermark signal 20, which is the output of the extraction module 110. In another example, the monitoring module 160 may monitor a signal (not shown) that includes the watermark message together with an audio program and sounds in the field environment.

Implementing a monitoring module such as the module 160 that may indicate the degree to which the watermark signal can be detected and/or decoded may require taking into consideration the specific encoder 10 that creates the watermark signal 20. For purposes of illustration the present disclosure assumes that the encoder 10 injects tones at unique frequencies as a way of embedding data. This is similar to frequency shift keying (FSK) technology. Two mutually exclusive frequencies, Freq1 and Freq2, for example, represent one bit of information. Four possible frequencies contains two bits, eight frequencies contains three bits, etc.

A burst of one frequency, having a duration of T sec, is called a symbol. Symbol rate and data rate are related by the number of bits per symbol. Multiple sequential symbols represent a message of n symbols. A group of frequencies closely spaced is called a channel or spectral channel. The encoder 10 may employ one or more spectral channels. Each channel may or may not deliver the same information. When all channels deliver the same information, the system is highly redundant. A message may be composed of static symbols such as a sync symbol, a number of station ID symbols, a number of network ID symbols and error checking symbols, and non-static symbols. Such a message may repeat, perhaps with changes in the non-static symbols.

For purposes of illustration the present disclosure assumes that the encoder 10 produces symbols that have four bits of information each. This corresponds to 16 possible frequencies for a given symbol. The present disclosure also assumes that the encoder 10 produces symbols that encode the station identify, the network identity, the source identity, etc. and that some channels contain the same information as other channels.

To decode the watermark a decoder such as decoder 55 must be able to determine the start of a message. A given frequency has a meaning only when the symbol type (station identify, network identity, source identity, etc.) has been determined and the symbol type is determined by the symbol's location in the message. Often, a special frequency is added to the frequency set to indicate the beginning of a message. This is called the synchronization frequency. For purposes of illustration the present disclosure assumes that the encoder 10 uses a $17^{th}$ frequency added to the 16 frequency set as the synchronization frequency.

It is not necessary for effective implementation of the monitoring module 160 to know the actual implementation of the encoder 10. Watermark detectability (i.e., the ability to decode the watermark) as indicated by the watermark detectability indication 159 may be determined, in essence, by a dynamically changing signal-to-noise ratio (S/N) measurement that depends on energy of the signal (i.e., the watermark portion) and the noise (i.e., the audio program, environmental sounds, etc.) as described below.

The monitoring module 160 may take advantage of the fact that some of the symbols in the watermark message remain constant such as the sync symbol(s) and the station ID symbols. This allows for establishing an internal reference truth for the values of the various frequencies of those symbols that remain constant. For example, in channel 1 the sync symbol (symbol 1) may always be 1.033 kHz lasting for one symbol duration and the station ID symbols, which might use three symbols (symbols 2 to 4), may always be the sequence 1.078 kHz, 1.039 KHz, and 1.041 kHz. The same would be true for each of the channels (i.e., same sync symbol and same station ID symbols). A group of frequencies in channel 1 might span the range from 1.000 kHz to 1.060 kHz, while the frequencies of channel 2 might span the range from 1.210 kHz to 1.270 kHz, and so on.

Prior to monitoring operation of the monitoring module 160, a calibration of the module 160 may be performed to capture the "truth" in those symbols that are constant. The calibration phase may be performed with a known audio program such as, for example, white noise. This will enable all channels to have full level tones. Alternatively, the truth may be captured gradually over a period of time. A series of messages all of which have the same frequencies in the static symbols becomes the basis for truth. If the frequencies in a given symbol jump around and change from message to message, either the symbol is not constant or the monitoring module 160 is operating on some kind of noise.

The monitoring module 160 does not need to consider all of the symbols in a message to determine detectability or decodabilty. The known symbols that are constant become proxies for the unknown symbols that are not constant. In the limit, the ability to detect the sync symbol under normal operation with audio program and environmental noise may be used as a proxy for all the symbols. Moreover, the monitoring module 160 may not need to decode the watermark message to determine its detectability or decodabilty.

Figure 16:
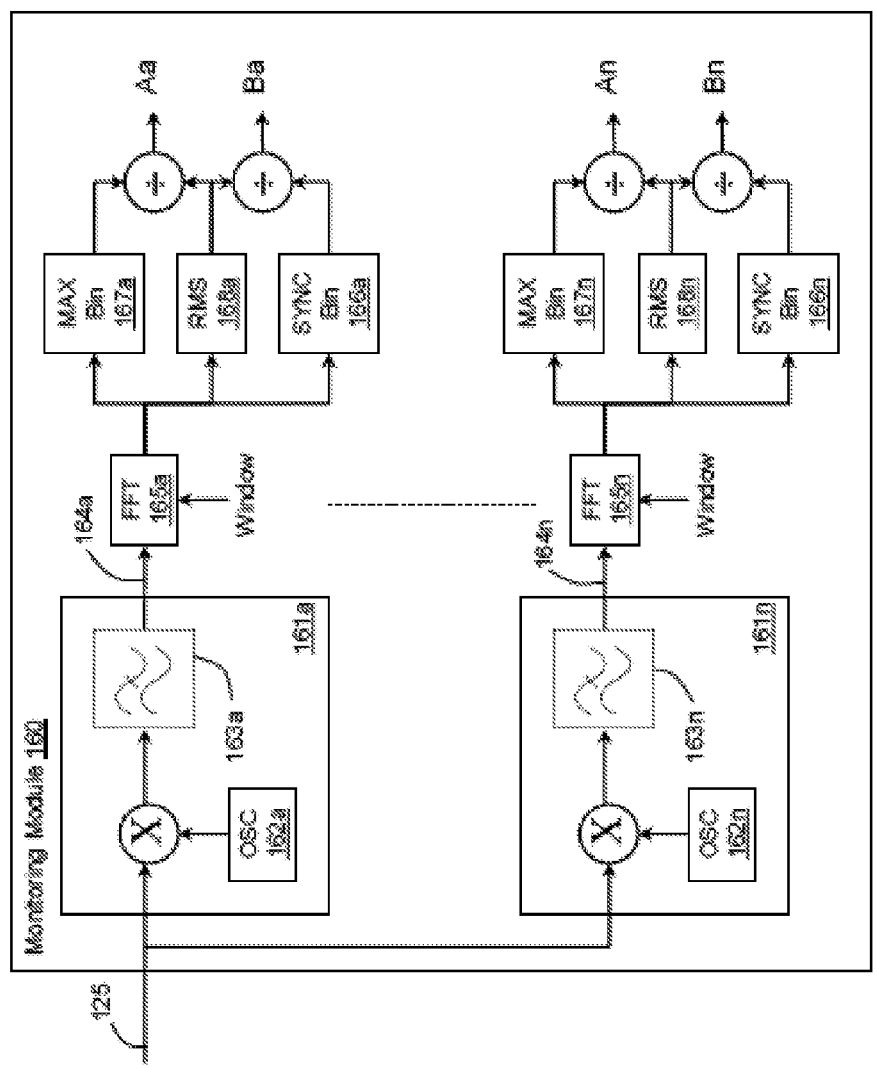
FIG. 16 illustrates a detailed block diagram of a portion of an exemplary monitoring module.

FIG. 16 illustrates a detailed block diagram of an exemplary monitoring module 160. The monitoring module 160 receives a watermarked signal such as the enhanced output signal 125. The monitoring module 160 includes channel separators 161*a-n* that separate the enhanced output signal 125 into its spectral channels.

In the illustrated embodiment, the channel separators 161*a-n* each includes an oscillator 162 that generates a complex demodulation signal with a frequency corresponding to the center frequency of the respective spectral channel. The enhanced output signal 125 is multiplied by the demodulation signal to effectively spectrally shift the enhanced output signal 125 so that each channel is re-centered at 0 Hz. For example, the oscillator 162*a* corresponding to channel 1 may generate a complex demodulation signal that has a frequency of 1.030 kHz corresponding to the center frequency of channel 1. A second channel in the region from 2.10 kHz to 2.16 kHz may use a local complex oscillator at 2.13 kHz, and so on. Each of the n channels is shifted to 0 kHz using the same process.

Each of the channel separators 161*a-n* may also include a low pass filter 163 with a bandwidth corresponding to the width of the spectral channel. The filters 163*a-n* filter the spectrally shifted signals to obtain respective spectral channels 164*a-n*.

The monitoring module 160 also includes frequency bin separators 165*a-n* that separate the spectral channels 164*a-n* into frequency bins. In the illustrated embodiment of FIG. 16, the frequency bin separators 165*a-n* are embodied by fast fourier transform (FFT) driven by a window function. The window function is designed for the windows to have a width corresponding to the duration of each the symbols. The number of FFT bins k is designed to give spectral resolution that allows for a single tone to be detected. For example, watermarking tones in a given channel may be spaced at intervals of 3 Hz and there may be four or more bins between possible tones. In one embodiment, this means that k should be selected to produce a bin width of 0.75 Hz. Appropriate time widths of the window function and spectral resolutions of the FFT bins may vary.

The monitoring module 160 also includes detectors 166 *a-n* that detect frequency bins corresponding to a symbol that is constant or that appears in a plurality of the spectral channels 164*a-n*. In the illustrated embodiment, the detectors 166*a-n* are sync detectors and the constant symbol corresponds to the synchronization symbol of the watermark message. Each sync detector 166 identifies a frequency bin corresponding to the synchronization symbol of the watermark message in the respective channel. As described above, the frequency corresponding to the synchronization symbol may be unique in the channel and only used for detecting the sync.

The monitoring module 160 also includes highest amplitude or max bin detectors 167*a-n* each of which identifies a frequency bin with the highest amplitude. In the illustrated embodiment, each max bin 167 obtains the value of the FFT bin with the highest amplitude and that value is normalized by dividing by the RMS value of all of the bins as calculated by RMS 168*a-n*. The outputs Aa-n are essentially a measure of the spectral purity of the highest amplitude bin. If most of the energy in the channel corresponds to the highest amplitude bin (the energy of the highest amplitude bin is equal or almost equal to the total energy of all the bins), then the ratio at Aa is 1.0.

In one embodiment (not shown), comparison of the output Aa to a threshold is used to determine if the input represents the kind of tone associated with a watermark (i.e., signal) or an artifact of audio program and/or environmental sound (i.e., noise). The amplitude of the output Aa or the amplitude of the highest amplitude bin is compared to a threshold, and the bin number of the highest amplitude bin is provided as the output Aa depending on the comparison of the amplitude to the threshold.

In the illustrated embodiment, the output of the sync detector 166 is similarly normalized by dividing by the RMS value of all of the bins as calculated by RMS 168 to obtain Ba-n.

Figure 17:
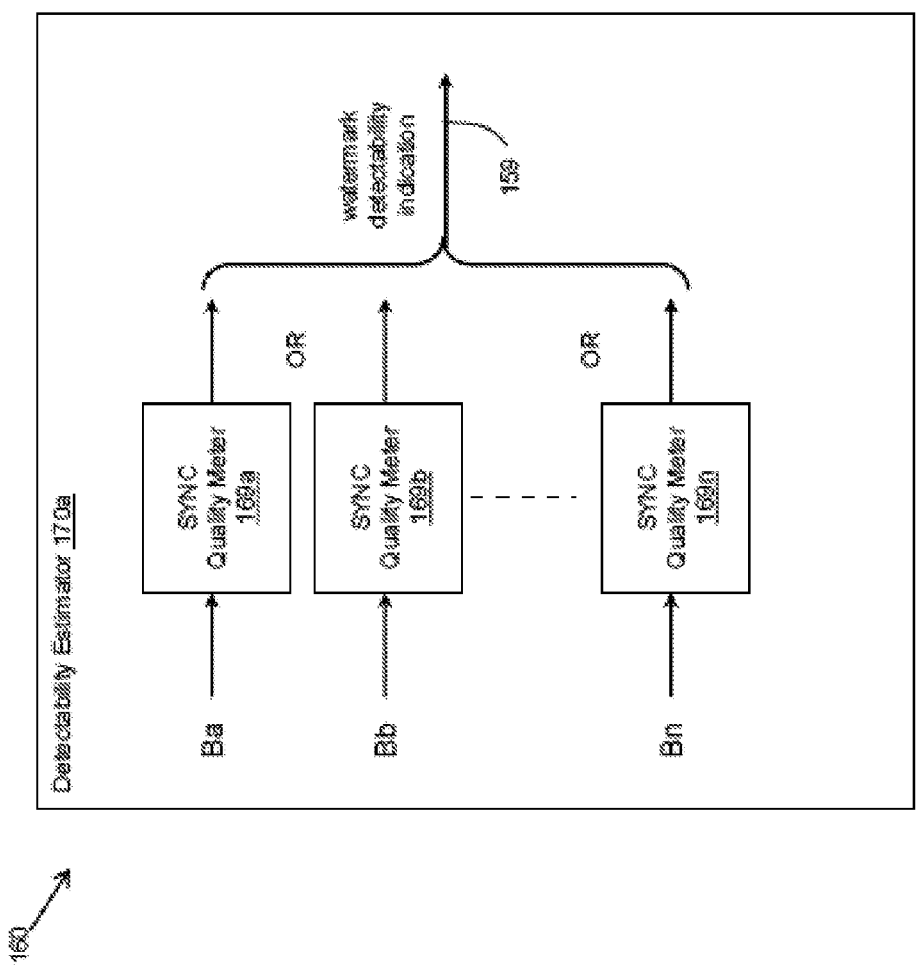
FIG. 17 illustrates a detailed block diagram of another portion of the exemplary monitoring module including a simple detectability estimator.
Figure 18A:
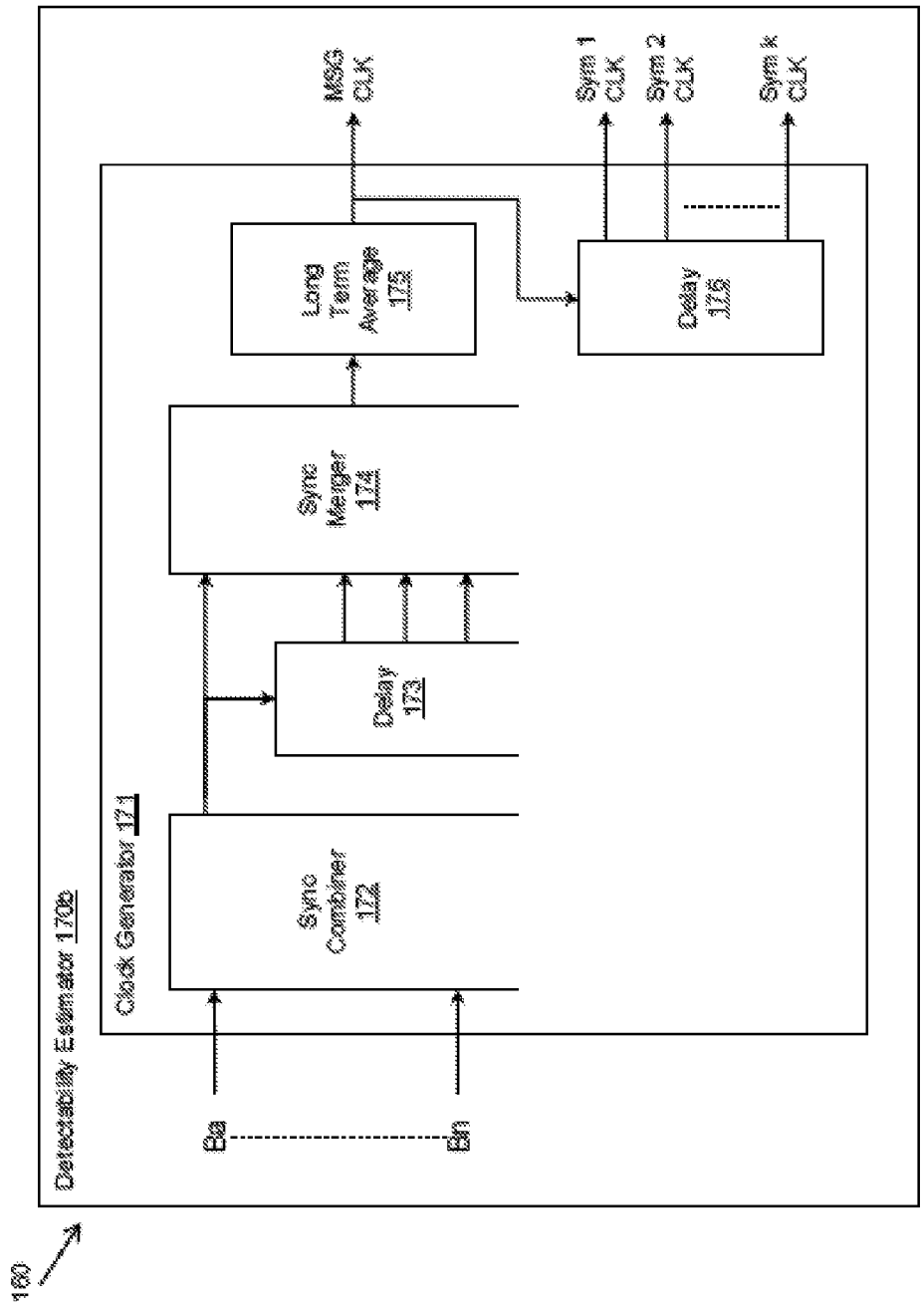
FIGS. 18A and 18B illustrate a detailed block diagram of another portion of the exemplary monitoring module including a relatively sophisticated detectability estimator.
Figure 18B:
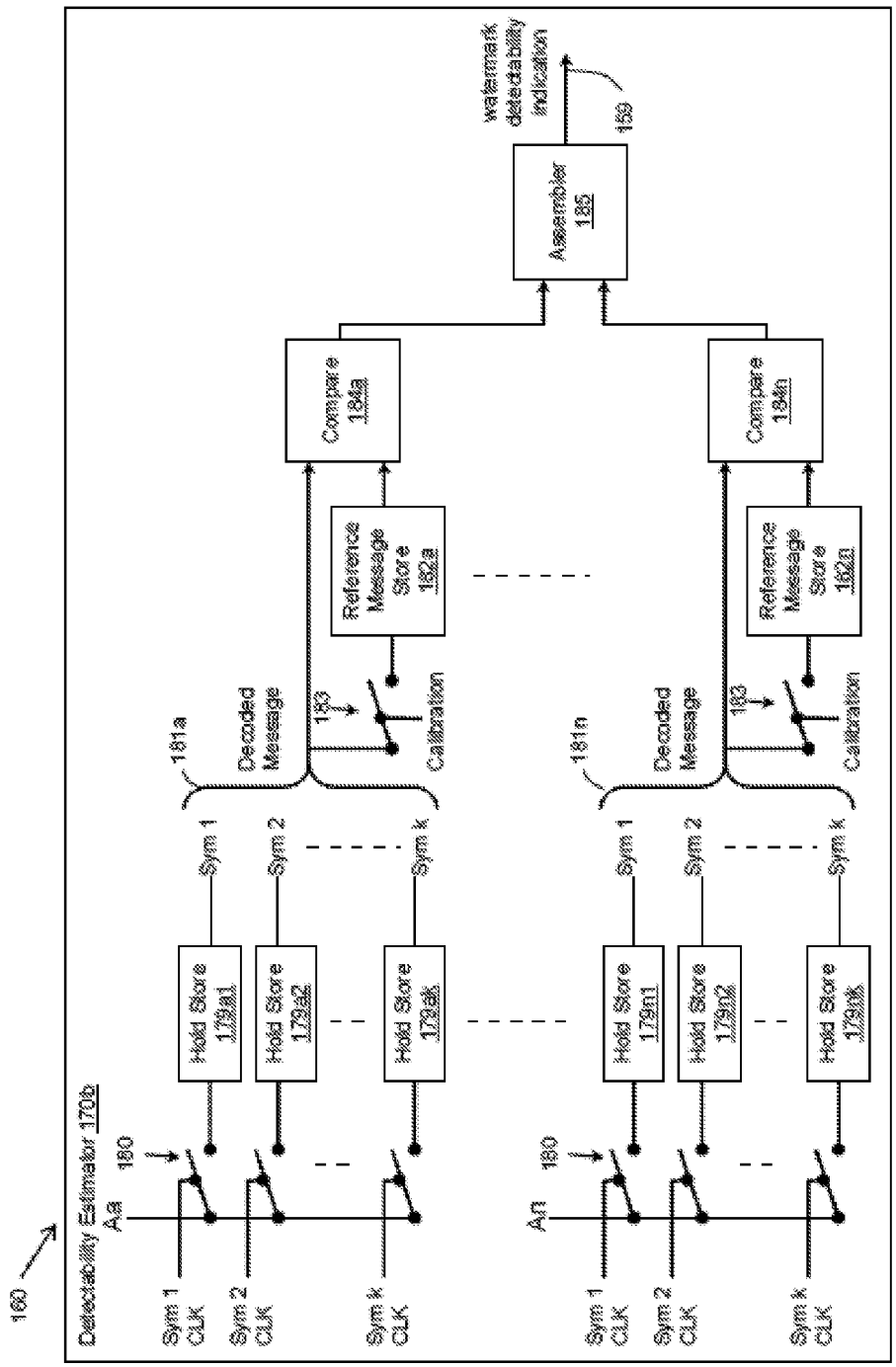

The monitoring module 160 also includes a detectability estimator 170 that, based on the frequency bins of the channels 164a-n, estimate the detectability of the watermark message to provide the watermark detectability indicator. In one embodiment, as illustrated in FIG. 17, the monitoring module 160 includes a simple detectability estimator 170a. In another embodiment, as illustrated in FIGS. 18A and 18B, the monitoring module 160 includes a more sophisticated detectability estimator 170b. In other embodiments, the monitoring module 160 includes detectability estimators different from those illustrated that estimate the detectability of the watermark message.

With reference to FIG. 17, the simple detectability estimator 170a includes sync quality meters 169a-n that determine the effective S/N ratio of the sync symbols as represented by the sync signals Ba-n. When a sync signal B is strong, its S/N will be close to 1. When the sync signal B is weak, its S/N is close to 0. There are n such quality meters 169a-n, one for each of the n channels 164a-n. If at least one sync symbol is high quality, then the corresponding channel may be assumed to be decodable and the watermark detectability indicator may indicate that. If the channel with the highest quality sync has a value above a preset threshold, the simple detectability estimator 170a assumes that the corresponding message may be decoded. Thus the detectability estimator 170a establishes the watermark detectability indicator based on a comparison of the strength of the frequency bin corresponding to the sync symbol and a preset threshold.

In practice, this simple detectability estimator 170a may be good enough in many applications to get a proper measure of decodability. In other applications, however, a more precise measure of decodability may be necessary.

With reference to FIG. 18A, the detectability estimator 170b includes a clock generator 171 that generates a message clock MSG CLK and symbol clocks Sym 1 CLK, Sym 2 CLK, . . . Sym k CLK based on an aggregate of the outputs Ba-n. Thus the clock generator 171 generates the message clock and the symbol clocks based on the frequency bins corresponding to the common synchronization symbol identified for the spectral channels 164a-n. The clock generator 171 combines the sync information obtained from the frequency bins to recreate a single time reference. This may be possible where all the watermark messages are time aligned over the channels 164a-n.

The clock generator 171 includes a sync combiner 172 that receives the sync signals Ba-n. The sync combiner 172 combines the sync signals Ba-n so that the absence of one or even some of the sync signals Ba-n does not degrade the time reference. In one embodiment, the combiner 172 is embodied by an adder that, in effect, combines the sync signals Ba-n. The output of the sync combiner 172 represents the "best guess" for time of the current message.

The clock generator 171 may also include the delay 173 and the sync merger 174. The delay 173 delays the output of the combiner 172 in multiple units of messages so that time information history may be further merged. Sync merger 174 merges this history. In essence, the delay 173 and the sync merger 174 combine the sync information of n channels looking backwards a number of messages. In this setup, even a marginally watermark is likely to produce adequate time reference.

The clock generator 171 also includes long term averager 175. Because the master clock in the encoder 10 is likely driven by a precision crystal, the long term averager 175 outputs a long term average message clock MSG CLK that effectively shadows the clock in the encoder 10. The long term averager 175 may be embodied by a filter, a phase locked loop, or other types of smoothing. The message clock MSG CLK is a periodic pulse at the starts of messages.

The clock generator 171 also includes a delay 176 which introduces delays from the message clock MSG CLK to output integer multiples of symbols in the message. Thus the delay 176 provides periodic clocks Sym 1 CLK, Sym 2 CLK, . . . Sym k CLK at the start of each of symbol 1, symbol 2, . . . symbol k, respectively.

With reference to FIG. 18B, the detectability estimator 170b includes hold registers 179, one hold register 179 for every symbol (Sym 1, Sym 2, . . . Sym k) for every one of the channels 164a-n. The switches 180 connect the outputs Aa-n to the hold registers 179. The symbol clocks Sym 1 CLK, Sym 2 CLK, . . . Sym k CLK control the switches 180 such that each of the hold registers 179 stores the bin number of the frequency bin with the highest amplitude for a respective one of the symbols Sym 1, Sym 2, . . . Sym N in the watermark message.

The detectability estimator 170b also includes combiners 181a-n that combine the outputs Sym 1, Sym 2, . . . Sym k of the hold registers 179 for each channel. The combined outputs Sym 1, Sym 2, . . . Sym k of the hold registers 179 for each channel correspond to a decoded message. Since these frequencies, Sym 1, Sym 2, . . . Sym k, are FFT bin numbers, the decoded message would be a number sequence of increasing symbol slots. For example, the decoded message may be something like the following sequence: 2, 19, −3, which correspond to Sym 1, Sym 2, . . . Sym k, respectively.

The detectability estimator 170b also includes a reference message store 182 that stores a reference message. The reference message stored in the message store 182 may be created during a calibration routine. During the calibration routine, the extracted watermark signal 20 is applied as the input to the monitoring module 160 such that the reference message may be created from the pure watermark signal 20. The calibration controls the switches 183 so that the decoded message captured with the watermark signal 20 as the input to the monitoring module 160 is stored in the reference message store 182 as the reference message.

In an alternative embodiment (not shown), most of the components of the monitoring module 160 may be replicated and the watermark signal 20 provided as the input to the replicated monitoring module. In this alternative embodiment, no calibration routine (or switches 183a-n) may be necessary because the reference message may be stored in the reference message store 182 simultaneously with steady state operation of the monitoring module 160.

In yet another alternative embodiment, the watermark signal 20 may be provided as an input to the monitoring module 160 via the switch 157. In this alternative embodiment, no calibration routine (or switches 183a-n) may be necessary because the reference message may be stored in the reference message store 182 simultaneously with steady state operation of the monitoring module 160. The watermark signal 20 as provided to the monitoring module 160 via the switch 157 may be seen as an auxiliary signal that is used to help emulate the monitoring function. Such auxiliary signal may provide a clock time reference that indicates where a message begins and where the bits can be found.

While the reference message stored in the reference message store 182 may be updated from time to time, once the reference message has been captured and stored in the reference message store 182, no further processing of the reference message is needed. Since the reference message is captured on a pure watermark signal the reference message should be robust.

The detectability estimator 170b also includes comparators 184a-n that compare the decoded message for each channel to the reference message stored in the store 182 to determine the symbol numbers of any symbols that are correct in the decoded message.

The detectability estimator 170b also includes an assembler 185 that takes advantage of the fact that the information is highly redundant for many of the symbols Sym 1, Sym 2, . . . Sym k. The assembler 185 attempts to assemble a complete watermark message in a predetermined period of time by combining symbol numbers of the watermark message. The assembler 185 determines the watermark detectability indication 159 based on whether the complete watermark message may be assembled in the predetermined period of time.

To assemble a complete message, the assembler 185 may combine symbols from different channels. For example, the assembler 185 may combine symbol 1 of channel 1 with symbol 2 of channel 91 with symbol 3 of channel 4, etc. Moreover, since much of the information in a message is repeated, the assembler 185 may also use previous messages for a given symbol. For example, for a case of twenty channels with a look-behind of five messages, there are one hundred repeats of each symbol. This means that, for this example, one hundred guesses are provided for symbol 1. If, say, fifteen of the one hundred guesses are correct, the assembler 185 may declare that symbol 1 is detectable since random noise will never produce that degree of consistency. The goal of the assembler 185 is to assemble a complete message proportional to the watermark message with all of its symbols over some period of time. If that goal is achieved, then high confidence exists that the watermark message is detectable and thus decodable by the decoder 55.

Although the watermarking signal 20 may contain encoded digital information, such as the station ID, etc. monitoring by the monitoring module 160 does not require the encoded information to be decoded. The monitoring module 160 does not care about the meaning of the information, but it is only concerned with whether the information is decodable. In other words, the monitoring module 160 may model a decode process without actually decoding the digital information. The output of the assembler 185 is not necessarily the decoded digital information, but may be a best guess of the actual decoding performed by the decoder 55.

In the radio station example, stations are given credit for a given unit of time for each listener if some criterion is met. For example, the crediting process might give a station credit for five minutes if the decoder 55 decodes two correct messages during those five minutes. While the monitoring module 160 may not decode the messages as does the decoder 55, the output of the monitoring module 160, the watermark detectability indication 159, will nevertheless be proportional to the results of the decoder 55. This approach makes the monitoring module 160 robust because it does not care if the manufacturer of the encoder 10 changes the meaning of the bits.

In one embodiment, the output of the monitoring module 160, the watermark detectability indication, is fed back explicitly or implicitly to, for example, the enhancement module 130 for the purpose of determining if more or less enhancement is required.

Figure 19:
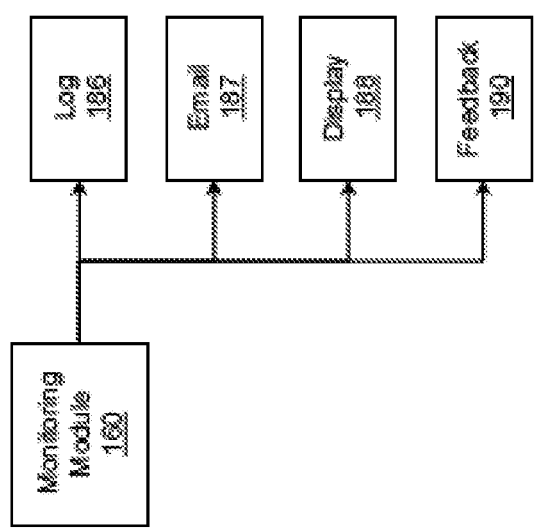
FIG. 19 illustrates a block diagram showing potential methods for providing feedback from a monitoring module.

FIG. 19 illustrates potential methods for providing such feedback. In an example of implicit feedback, a log 186 of the watermark detectability indicator 159 may be kept. In the manual mode of the enhancement module 130, the user may use the values stored in the log 186 to determine the detectability of the watermark and manually adjust the enhancement gain as necessary. This is feedback with the user embedded in the loop. Other examples of such feedback include an email 187 sent to the user or a display 188 showing values for the watermark detectability indicator 159. Again, the user may use these values to determine the detectability of the watermark and manually adjust the enhancement gain as necessary.

A fully automatic feedback 190, on the other hand, may adjust, for example, the enhancement module 130 without user participation.

Feedback

Figure 21:
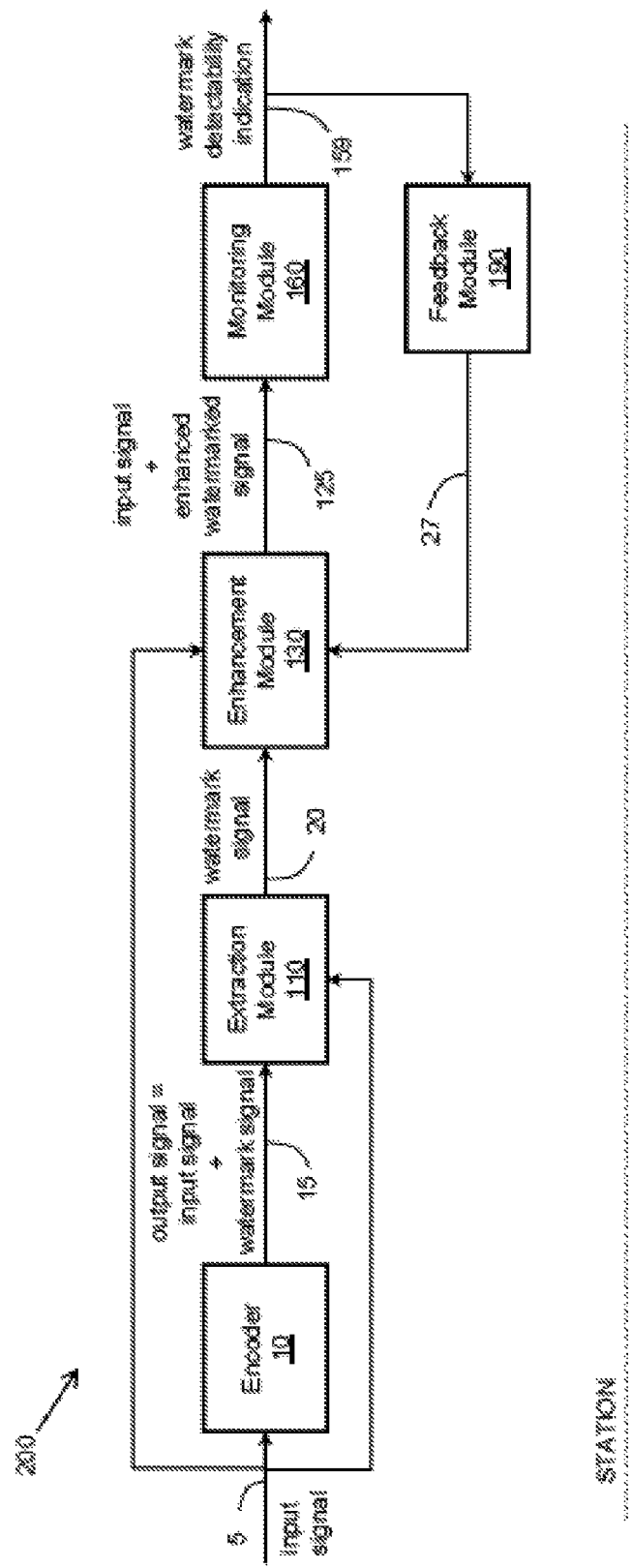
FIG. 21 illustrates a simplified block diagram of an exemplary system for providing feedback regarding detectability of a watermark message produced by the watermark encoder.

FIG. 21 illustrates a simplified block diagram of an exemplary system 200 for providing feedback regarding detectability of a watermark message produced by the watermark encoder 10. The system 200 includes the encoder 10, the extraction module 110, the enhancement module 130, the monitoring module 160 and a feedback module 190. The encoder 10, the extraction module 110, the enhancement module 130 and the monitoring module 160 have been described above. The feedback module 190 receives the watermark detectability indication 159 and outputs an enhancement indication 27 corresponding to a prescribed enhancement to the watermark signal 20 in which the watermark message is embedded.

As described above, enhancement of the watermark signal 20 performed by the enhancement module 130 may be automatically or dynamically controlled. The monitoring module 160, via the watermark detectability indication 159, indicates detection, a proxy for potential adequate or inadequate decoding of the watermark message by the decoder 55 of FIG. 1. The monitoring module 160, via the watermark detectability indication 159, may also indicate excessive audibility of the watermark message. Based on the watermark detectability indication 159, the feedback module 190 generates the enhancement indication 27 that controls the enhancement module 130. The enhancement module 130 receives the enhancement indication 27 so that it may enhance the watermark signal 20 based on the enhancement indication 27 to correct for, for example, inadequate decoding or excessive audibility of the watermark message.

Figure 22:
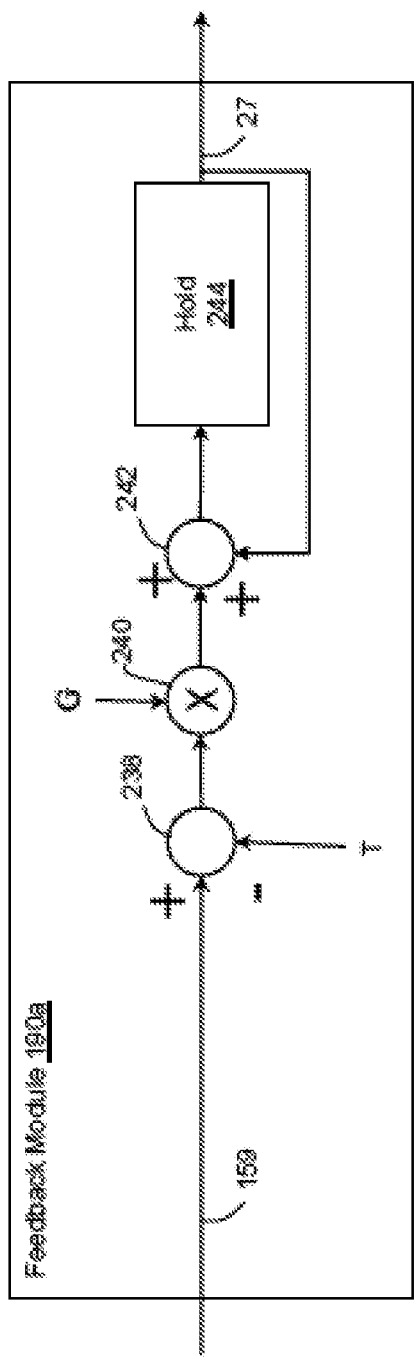
FIG. 22 illustrates a block diagram of an exemplary feedback module.

FIG. 22 illustrates a block diagram of an exemplary feedback module 190a. The feedback module 190a receives the watermark detectability indication 159 and compares the watermark detectability indication 159 to a threshold or target T. In the illustrated embodiment, the feedback module 190a includes a subtractor 238. A positive output of the subtractor 238 indicates that the watermark detectability indication 159 is higher than the threshold or target T and a negative output of the subtractor 238 indicates that the watermark detectability indication 159 is lower than the threshold or target T.

In the illustrated embodiment, the feedback module 190a includes a multiplier 240 to which a gain G may be applied to adjust the gain of the feedback loop of which the feedback module 190a forms part.

The feedback module 190a also includes a summer 242 and a hold block 244. The summer 242 adds the output of the subtractor 238 (or the output of the subtractor 238 as modified by the gain G) to the output of the hold 244, the current enhancement indication 27, to effectively increase or decrease the next enhancement indication 27 relative to the current enhancement indication 27 based on the comparison of the watermark detectability indication 159 to the threshold T.

In one embodiment (not shown), the feedback module 190a includes some form of damping to avoid ringing, overshoot, and possibly oscillations of the feedback loop. For example, the feedback module 190a may only incrementally make changes to the enhancement indication 27 to promote loop stability.

Figure 23:
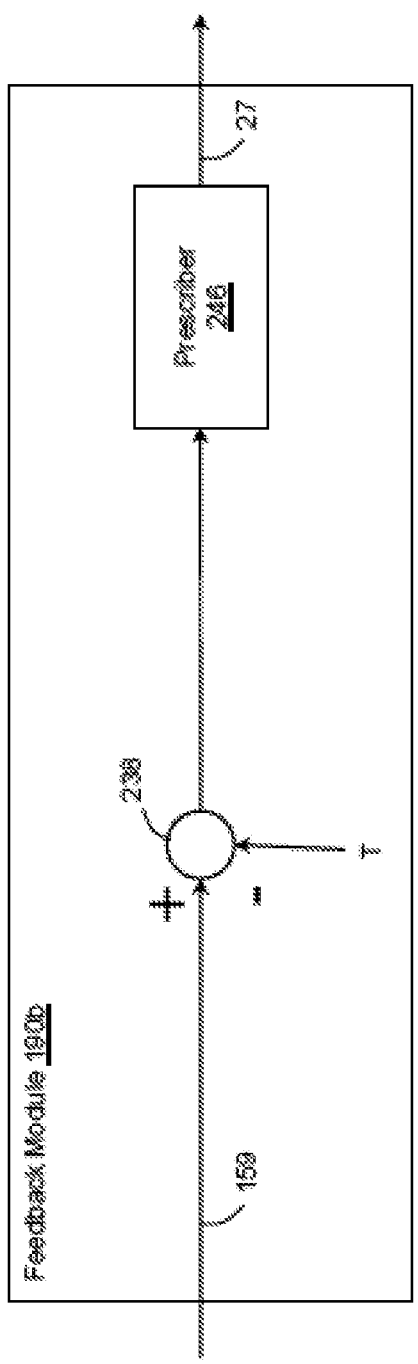
FIG. 23 illustrates a block diagram of another exemplary feedback module.

FIG. 23 illustrates a block diagram of an exemplary feedback module 190b. The feedback module 190b receives the watermark detectability indication 159 and compares the watermark detectability indication 159 to the threshold T by means of the subtractor 238 as described above. The feedback module 190b also includes a prescriber 246 that sets the enhancement indication 27 to correspond to a prescribed increased enhancement to the watermark signal 20 if the watermark detectability indication 159 is lower than the threshold T. In one embodiment, the prescriber 246 sets the enhancement indication 27 to correspond to a prescribed decreased enhancement to the watermark signal 20 if the watermark detectability indication 159 is higher than the threshold T.

Assuming, for example, that the current enhancement indication 27 corresponds to 3 dB of enhancement, if the most recently sampled value of the watermark detectability indication 159 is below the threshold T, enhancement may be increased by an incremental amount such as a 10% boost, or to 3.3 dB. If in the next time interval the sampled value of the watermark detectability indication 159 is still below the threshold T, the enhancement may be increased by another 10%, or to 3.63 dB. Conversely, if in the next time interval the sampled value of the watermark detectability indication 159 is above the threshold T, the enhancement may be decreased by 10%, back down to 3.3 dB and so on.

The 10% boost described above is merely one example of potential prescribed enhancement for the enhancement indication 27. Other prescribed enhancements may include percentage enhancement other than 10%, fixed amount enhancements (e.g., 0.3 dB. 0.5 dB, 1 dB, etc.), maximum enhancement that would not cause the watermark signal to be audible, etc.

In the embodiments of FIGS. 22 and 23, the feedback modules 190a and 190b acted on discrete samples of the watermark detectability indication 159.

Figure 24:
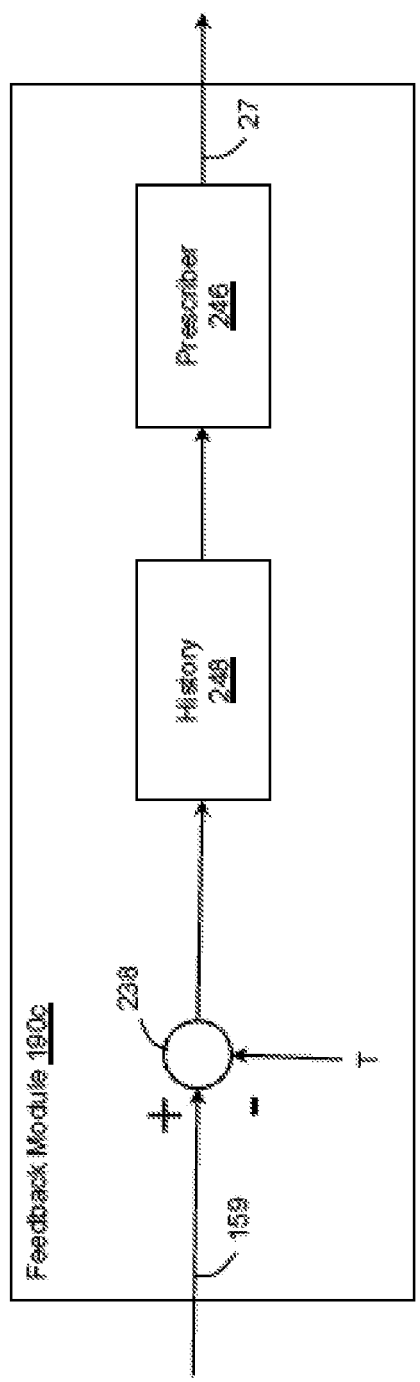
FIG. 24 illustrates a block diagram of another exemplary feedback module.

FIG. 24 illustrates a block diagram of an exemplary feedback module 190c. The feedback module 190c receives the watermark detectability indication 159 and compares the watermark detectability indication 159 to the threshold T by use of the subtractor 238 as described above. The feedback module 190c also includes the prescriber 246 that sets the enhancement indication 27 to correspond to a prescribed enhancement to the watermark signal 20 based on the watermark detectability indication 159 as described above.

The feedback module 190c also includes a history block 248 such that the feedback module 190c does not act on discrete samples of the watermark detectability indication 159, but on a history of the watermark detectability indication 159 corresponding to a time interval. The history block 248 collects a history for a time interval of the watermark detectability indication 159 as compared to the threshold T. Exemplary time intervals may include one minute, five minutes, ten minutes, etc.

Consider an example where the update rate, the history time interval, is set to one minute, which may correspond to a time interval in which the encoder 10 encoded a plurality of watermark messages. Assume that the current enhancement indication 27 corresponds to 3 dB of enhancement. If the history block 248 indicates that at no point in the time interval the watermark detectability indication 159 exceeded the threshold T, enhancement may be increased by an incremental amount such as a 10% boost, or to 3.3 dB for the next time interval. If in the next time interval the history block 248 still indicates that at no point in the time interval the watermark detectability indication 159 exceeded the threshold T, the enhancement may be increased by another 10%, or to 3.63 dB for the next time interval. Conversely, if in the next time interval the history block 248 indicates that at some point (perhaps multiple points) in the time interval the watermark detectability indication 159 exceeded the threshold T, the value of the enhancement may be decreased by 10%, back down to 3.3 dB and so on.

Figure 25:
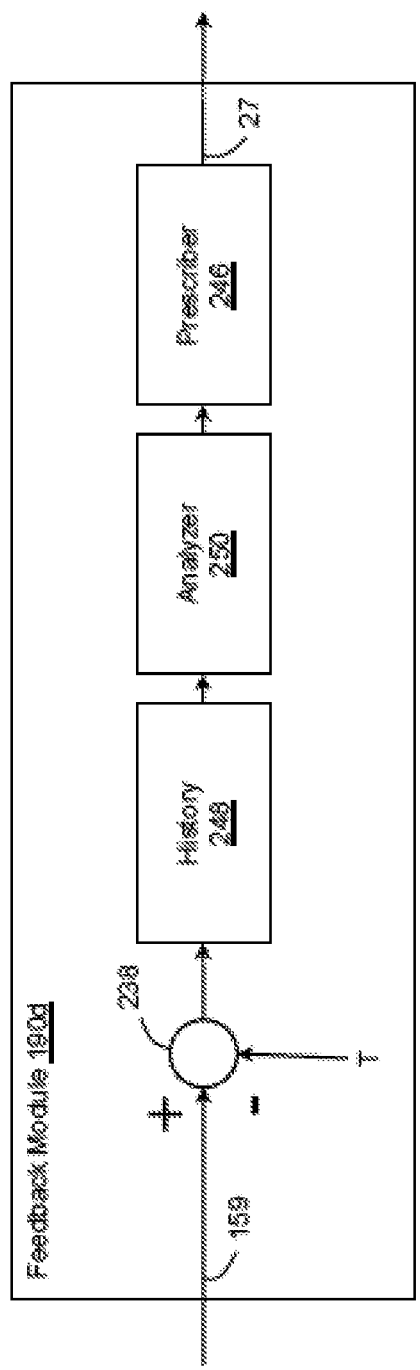
FIG. 25 illustrates a block diagram of another exemplary feedback module.

FIG. 25 illustrates a block diagram of an exemplary feedback module 190d. The feedback module 190d receives the watermark detectability indication 159 and compares the watermark detectability indication 159 to the threshold T by use of the subtractor 238 as described above. The feedback module 190d also includes the prescriber 246 that sets the enhancement indication 27 to correspond to a prescribed enhancement to the watermark signal 20 based on the watermark detectability indication 159 and the history block 248 as described above.

The feedback module 190d also includes an analyzer 250, which analyzes the history in the history block 240 and causes the prescriber 246 to prescribe enhancements based on that analysis. In one embodiment, the analyzer 250 is implemented as a Bayesian probability analyzer. The history block 248 collects the history of the watermark detectability indication 159 as it relates to the threshold T for a plurality of time intervals. The analyzer 250 analyzes the history to predict patterns of detectability and causes the prescriber 246 to generate or change the enhancement indication 27 based on the analysis of the history and the predicted patterns of detectability.

For example, the history block 248 may collect history for relative larger time intervals such as hours, days, weeks, months, etc. At the transient, during the time when the history block 248 begins to gather history, the analyzer 250 may cause the prescriber 246 to prescribe enhancements based on short term history similar to the embodiment of FIG. 24 above. However, as the amount of history in the history block 248 increases, the analyzer 250 may begin to recognize patterns in the history. The analyzer 250 may cause the prescriber 246 to prescribe enhancements based, not only in short term history, but also in longer term history in the history block 248.

Thus the history block 248 may store past performance and the analyzer 250 may extract patterns from history in order to predict the best values for enhancement moving forward in time. Such an analysis system builds a model of what is happening, and include the ability to determine to what degree the model is stable. A stable model has high predictive value.

Such patterns may span long time intervals. For example the analyzer 250 may recognize a pattern that repeats every ten minutes because the radio program goes to commercials every ten minutes. Or the analyzer 250 may recognize a pattern that repeats at the top of every hour because the station always broadcasts a standard station-identification jingle at those times. An even longer duration pattern might be observed when comparing between days. Monday during the day time may have the same pattern as Tuesday during the day time, for example. Weekdays between 1:00 PM and 2:00 PM may have the same pattern.

From recognition of these patterns the analyzer 250 may cause the prescriber 246 to change the enhancement indication 27. In one embodiment, the analyzer 250 causes the prescriber 246 to change the enhancement indication 27 to increase or decrease enhancement at the corresponding periodic rates of the patterns. In another embodiment, the analyzer 250 causes the prescriber 246 to provide a starting value for the enhancement indication 27 according to the recognized patterns. The feedback module 190*d* may then adjust the enhancement indication 27 based on immediate or short term history to fine tune the enhancement.

In yet another embodiment, the analyzer 250 causes the prescriber 246 to change the enhancement indication 27 to increase or decrease enhancement at the corresponding periodic rates of the patterns, but the analyzer 250 flushes or abandons the pattern whenever it is clear from immediate or short term history that the pattern is no longer applicable. For example, the analyzer 250 may flush or abandon the pattern when a song ends and a male announcer begins reporting the news. The analyzer 250 may cause the prescriber 246 to switch to a default prescribed enhancement for male announcers or the analyzer 250 may cause the prescriber 246 to simply keep enhancement at its current level until additional history is obtained.

Figure 26:
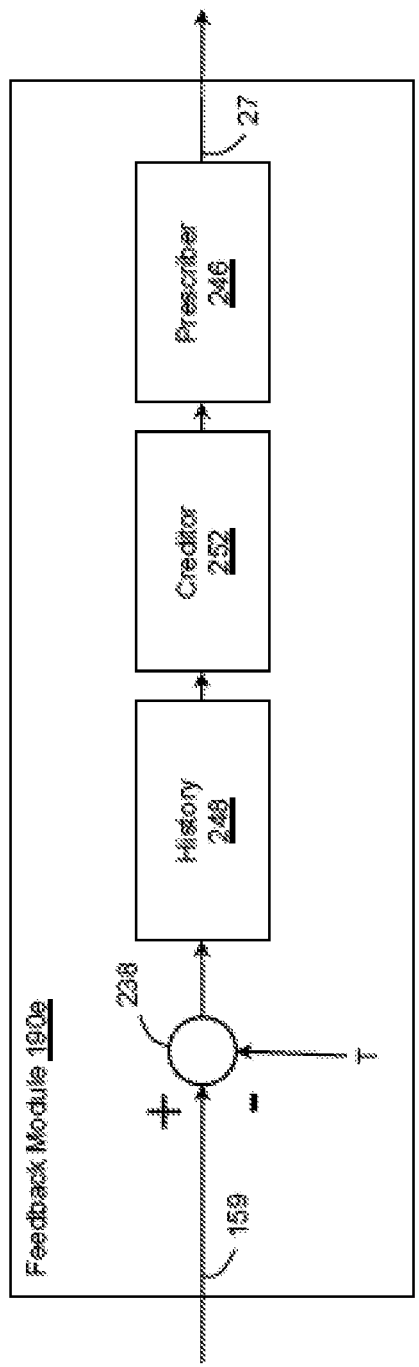
FIG. 26 illustrates a block diagram of another exemplary feedback module.

FIG. 26 illustrates a block diagram of an exemplary feedback module 190*e*. The feedback module 190*e* receives the watermark detectability indication 159 and compares the watermark detectability indication 159 to the threshold T by use of the subtractor 238 as described above. The feedback module 190*e* also includes the prescriber 246 and the history block 248 as described above. The feedback module 190*e* also includes a creditor 252 which models a crediting algorithm such as, for example, the crediting algorithm that would give credit to a radio station for a listener to the radio station.

As discussed above in reference to FIG. 1, radio stations may be given credit for a time period for each listener if some criterion is met. The history block 248 collects a history of the watermark detectability indication 159 as compared to the threshold T and outputs the history information to the creditor 252. Every instance in which the detectability indication 159 exceeds the threshold T may be scored by the creditor 252 as the equivalent of a correct decode by the decoder 55. The creditor 252 receives the output of the history block 248 and it "credits" the station for a given period of time under the same (or different) criterion as the crediting algorithm.

In one embodiment, the creditor 252 may analyze the crediting time period and cause the prescriber 246 to prescribe enhancements based on that analysis to increase the chances of obtaining credit for the radio station for the next time period. In another embodiment, the creditor 252 may analyze the crediting status or crediting history of the crediting time period along the time period (in real time or near real time) and cause the prescriber 246 to prescribe enhancements based on that analysis to increase the chances of obtaining credit for the radio station for the present time period.

In one embodiment, the creditor 252 determines a number of times in history that the watermark detectability indication 159 equals or exceeds the threshold T. The creditor 252 credits detection of the watermark message for a time period if the determined number of times that the watermark detectability indication 159 equals or exceeds the threshold T is equal to or exceeds a predetermined number in the time period as prescribed by the crediting algorithm. The creditor 252 may then cause the prescriber 246 to generate or change the enhancement indication 27 based on whether detection of the watermark message has been credited or is likely to be credited.

For example, a simple crediting algorithm may give a station credit for a five minutes time period if the decoder 55 decodes two correct watermark messages during those five minutes. Every instance that the detectability indication 159 exceeds the threshold T during the five minutes is scored by the creditor 252 as the equivalent of a correct decode by the decoder 55. The creditor 252 "credits" the station for the five minute time period if the history from the history block 248 shows that the detectability indication 159 exceeded the threshold T at least twice (the equivalent of two correctly decoded watermark messages) during the five minute time period.

Also, if during the five minute time period it becomes apparent to the creditor 252 that under the current enhancement credit is unlikely to be obtained (e.g., history shows that the detectability indication 159 has not exceeded the threshold T even once after four minutes of the five minute time period), the creditor 252 may cause the prescriber 246 to prescribe a more aggressive enhancement to increase the chances of obtaining credit for the radio station for the five minute time period. On the other hand, if during the five minute time period it becomes apparent to the creditor 252 that credit will be obtained or is very likely to be obtained (e.g., history shows that the detectability indication 159 exceeded the threshold T at least twice prior to the end of the five minute time period), the creditor 252 may cause the prescriber 246 to prescribe a less aggressive enhancement to reduce the chances of the watermark message being audible.

In another embodiment, the creditor 252 determines a number of time intervals in the time period for which the watermark detectability indication 159 equals or exceeds the threshold T. The creditor 252 credits detection of the watermark message for the time period if the determined number of time intervals of the time period that the watermark detectability indication 159 equals or exceeds the threshold T is equal to or exceeds a predetermined number of time intervals for the time period as prescribed by the crediting algorithm. The creditor 252 may then cause the prescriber 246 to generate or change the enhancement indication 27 based on whether detection of the watermark message has been credited or is likely to be credited.

For example, a crediting algorithm may give a station credit for a 15 minute time period if the decoder 55 successfully decodes one or more watermark messages in at least five one-minute intervals in the 15 minute time period. If history shows that the detectability indication 159 has not exceeded the threshold T even once after ten one-minute intervals of the 15 minute period, then the only chance for getting credit for the 15 minute period is to have high enhancement that produces high watermarking so that each of the last five 1-minute intervals may be decoded correctly. Conversely, if history shows that the detectability indication 159 exceeded the threshold T for each of the first five one-minute intervals, then the remaining ten minutes can have very low enhancement, and correspondingly low (and hopefully) inaudible watermarking.

In the middle case, history may show that the detectability indication 159 exceeded the threshold T for three one-minute intervals in the first five minutes. Ten minutes remain in the 15 minute time period. The detectability indication 159 must exceed the threshold T for at least two of those ten one-minute intervals remaining in the 15 minute time period. The creditor 252 may cause the prescriber 246 to ramp up enhancement to gradually increase watermarking energy. And the creditor 252 and/or prescriber 246 may become gradually more aggressive (or less aggressive) as the returns from the enhancement begin to show in the history. If and when the additional two one-minute intervals necessary for a credit have been detected, the enhancement can go back to a less aggressive state.

Thus, in one embodiment in which a crediting algorithm gives a station credit for a time period T if the decoder 55 successfully decodes a predetermined number of watermark messages m in the time period T, the creditor 252/prescriber 246 combination increases a level of the prescribed enhancement to the watermark signal via the enhancement indication 27 if the determined number of times x that the detectability indication 159 exceeded the threshold T at a point in time t during the time period T is:

$$x \leq m \cdot (t/T) \qquad \text{Eq. 1}$$

Similarly, in the embodiment in which a crediting algorithm gives a station credit for a time period T if the decoder 55 successfully decodes a predetermined number of watermark messages m in the time period T, the creditor 252/prescriber 246 combination may decrease the level of the prescribed enhancement to the watermark signal via the enhancement indication 27 if the determined number of times x that the detectability indication 159 exceeded the threshold T at a point in time t during the time period T is:

$$x > m \cdot (t/T) \qquad \text{Eq. 2}$$

In one embodiment, the creditor 252 flushes or abandons a course of action when it becomes clear from immediate or short term history that the current enhancement is no longer applicable. For example, when a song ends and a male announcer begins reporting the news the creditor 252 may flush or abandon a course of action that would have caused the prescriber 246 to ramp up enhancement to gradually increase watermarking energy. The creditor 252 may cause the prescriber 246 to switch to a default prescribed enhancement for male announcers or the creditor 252 may cause the prescriber 246 to simply keep the enhancement at its current level until additional history is obtained.

As described above in reference to FIG. 10, the enhancement control module 140 may be set such that station automation information including information about scheduled programming (e.g., speech intensive programming, music intensive programming, sports, etc.) controls the enhancement module 130 and thus enhancement of the watermark signal 20.

In contrast to a feedback module, which looks backwards in time, a future prediction system could be implemented if the station is automated with playout automation information or broadcast traffic information and/or pre-recorded audio.

Figure 27:
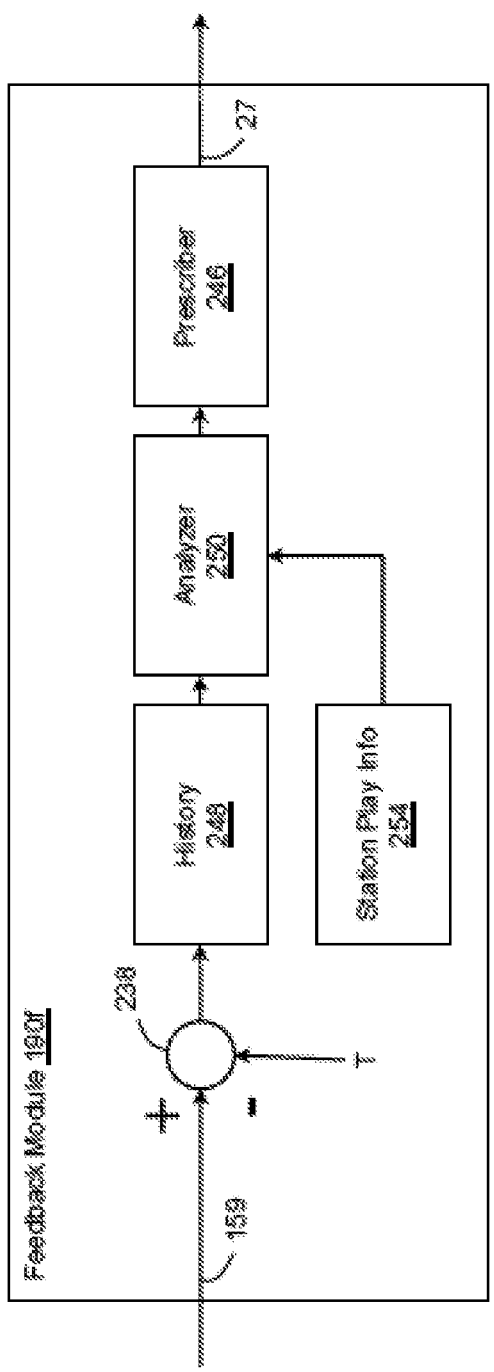
FIG. 27 illustrates a block diagram of another exemplary feedback module.

FIG. 27 illustrates a block diagram of an exemplary feedback module 190f. The feedback module 190f includes the subtractor 238, the prescriber 246, the history block 248 and the analyzer 250 as described above. In one embodiment (not shown), the feedback module 190f includes the creditor 252 instead or in addition to the analyzer 250. The feedback module 190l also includes a station play info block 254 that stores playout automation information and/or broadcast traffic information.

In one embodiment, the station info block 254 includes a data field that specifies characteristics (e.g., spectrum) for each element in the playout automation information and/or broadcast traffic information.

The information in the station info block 254 is fed to the analyzer 250 in addition to the history information. The combination of the feedback history provided via the history block 248 and the station play information provided via the block 254 may provide more optimum results that the history alone.

In one embodiment, the analyzer 250 may cause the prescriber 246 to generate the enhancement indication 27 based on the playout automation information and/or broadcast traffic information in the block 254. As described above, the prescribed enhancement indication 27 may be based on a model corresponding to the program. For a given radio station there might be a number of models such as, for example, male announcer, female announcer, hard-rock music, folk music, classical music, etc. Each of these models may have subtypes such as, for example, male announcer/talk show, male announcer/basketball game, etc. Each subtype may have its own optimum enhancer gain. However, if the history from the history block 248 indicates that the current enhancement is not adequate, the analyzer 250 may cause the prescriber 246 to generate a different enhancement indication 27 corresponding to a different model.

In another embodiment, the analyzer 250 may begin by causing the prescriber 246 to generate an enhancement indication 27 based on the playout automation information and/or broadcast traffic information in the block 254. The analyzer 250 may then cause the prescriber 246 to gradually adjust the enhancement indication 27 based on the, presumably more accurate, recent history information from the history block 248.

The present disclosure provides a number of representative examples for providing explicit and/or automatic feedback. However, a wide variety of algorithms could be implemented in, for example, artificial intelligence to provide feedback within the meaning and scope of the invention.

Also, the system 200 of FIG. 21 provides feedback in a sort of an ideal set up. That is, the system 200 provides feedback via the feedback module 190 and enhances the watermark signal via the enhancement module 130 based on that feedback, but the feedback loop of the system 200 does not account for distortion to the watermarked signal 15 or the enhanced watermarked signal 125 caused in the "real world" by the environment 45 as shown in FIG. 1.

Simulation

Figure 28:
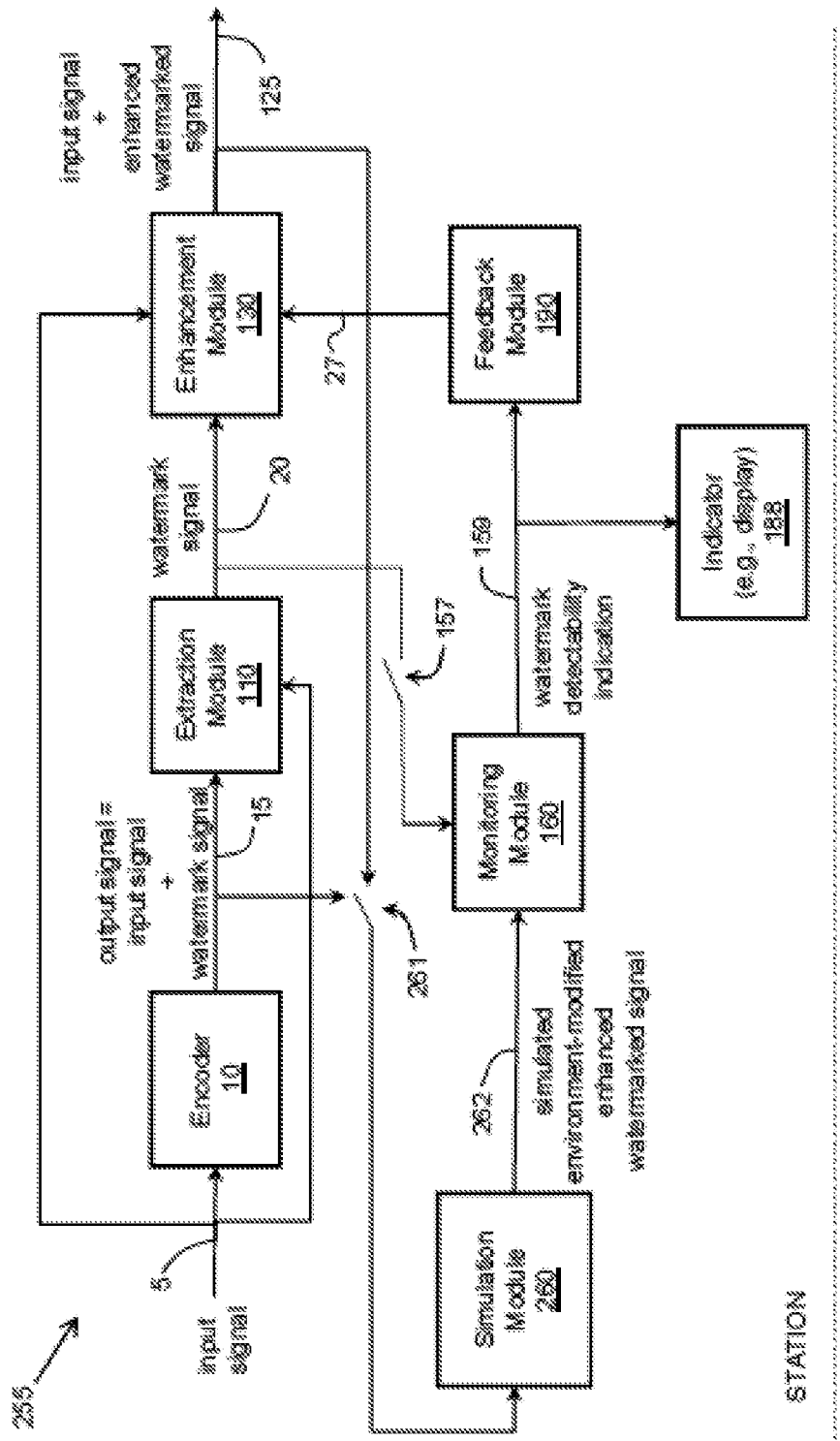
FIG. 28 illustrates a simplified block diagram of an exemplary system for providing feedback regarding detectability of a watermark message produced by the watermark encoder.

FIG. 28 illustrates a simplified block diagram of an exemplary system 255 for providing feedback regarding detectability of a watermark message produced by the watermark encoder 10. The system 255 includes the encoder 10, the extraction module 110, the enhancement module 130, the monitoring module 160, the feedback module 190 and a simulation module 260. The encoder 10, the extraction module 110, the enhancement module 130, the monitoring module 160 and the feedback module 190 have been described above.

The simulation module 260 receives the watermarked signal 15 or the enhanced watermarked signal 125 (as chosen by operation of the switch 261) and combines the received signal with a simulated environment signal to obtain a simulated environment-modified watermarked signal 262. The simulated environment-modified watermarked signal 262 may then be fed to the monitoring module 160 to generate the watermark detectability indication 159 based on the simulated environment-modified watermarked signal 262.

The end user of the system 255 (e.g., a radio station) may be well positioned to know or understand the environment in which listeners will listen to its programs. In the example of a radio station, the station may know that a morning drive-time program in a metropolitan area is likely to have listeners who are driving their cars to work, while a morning drive-time program in a rural environment may have listeners who are driving tractors or trucks. Cars, tractors and trucks all cause some amount of road noise in the listening environment, while tractors and trucks may produce a larger amount of road noise than cars. Similarly, a sporting event is likely to have a relatively large percentage of listeners who have gathered in a bar or tavern, which may have a kind and/or level of noise, such as crowd noise, different from road noise.

The simulation module 260 provides the user of the system 255 with choices for a model for the expected listener's environment, both the type of sounds and their intensity. For example, simulated environment choices might include: noise at a sports venue during a sports event, dinner time kitchen, road noise in a vehicle, office, quiet living room, crowd noise, muffling of the program audio in a user's pocket, outdoors noise, etc. The simulation module 260 may include predetermined signals that simulate each of these environments or custom, more accurate signals may be programmed into the simulation module 260. In addition to adding extraneous sound, the simulated environment may also attenuate or filter the program signal that contains the watermarking. For example, a plush living room is likely to attenuate high frequencies as they progress from the loudspeaker 40 to the decoder 50 (see FIG. 1). Similarly, the decoder 50 located in a winter coat or ladies handbag is likely to both attenuate the program and generate local noise.

The simulated environment would typically be chosen with the corresponding station, program, time, etc. in mind because the chosen simulated environment would influence the level of enhancement provided by the enhancement module 130. For example, with high road noise, the enhancement gain will likely be relatively large because the quality of road noise is such that it tends to raise detectability without producing the disturbance of loud tones because the road noise also masks them. If the simulated environment is chosen as high road noise, but the program actually correspond to a different, quieter environment, the applied watermark enhancement may result in audibility of the watermark.

In one embodiment, a user may select a simulated environment that the user deems an appropriate choice for the station, program, time, etc. In another embodiment, the simulated environment is chosen automatically or semi-automatically based on station playout automation information and/or broadcast traffic information. In yet other embodiments, the simulated environment is chosen automatically or semi-automatically based on information other than station playout automation information and/or broadcast traffic information.

Thus, while the encoder 10 may provide a "one size fits all" approach to watermarking, the combinations of the extraction module 110, the enhancement module 130, the monitoring module 160, the feedback module 190 and the simulation module 260 of the systems 100, 120, 150, 200 and 255 allow for the user to custom tune the properties of the watermarking based on the particular context.

Methods

Exemplary methods may be better appreciated with reference to the flow diagrams of FIGS. 5, 11-15, 20 and 29-32. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagram, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 5:
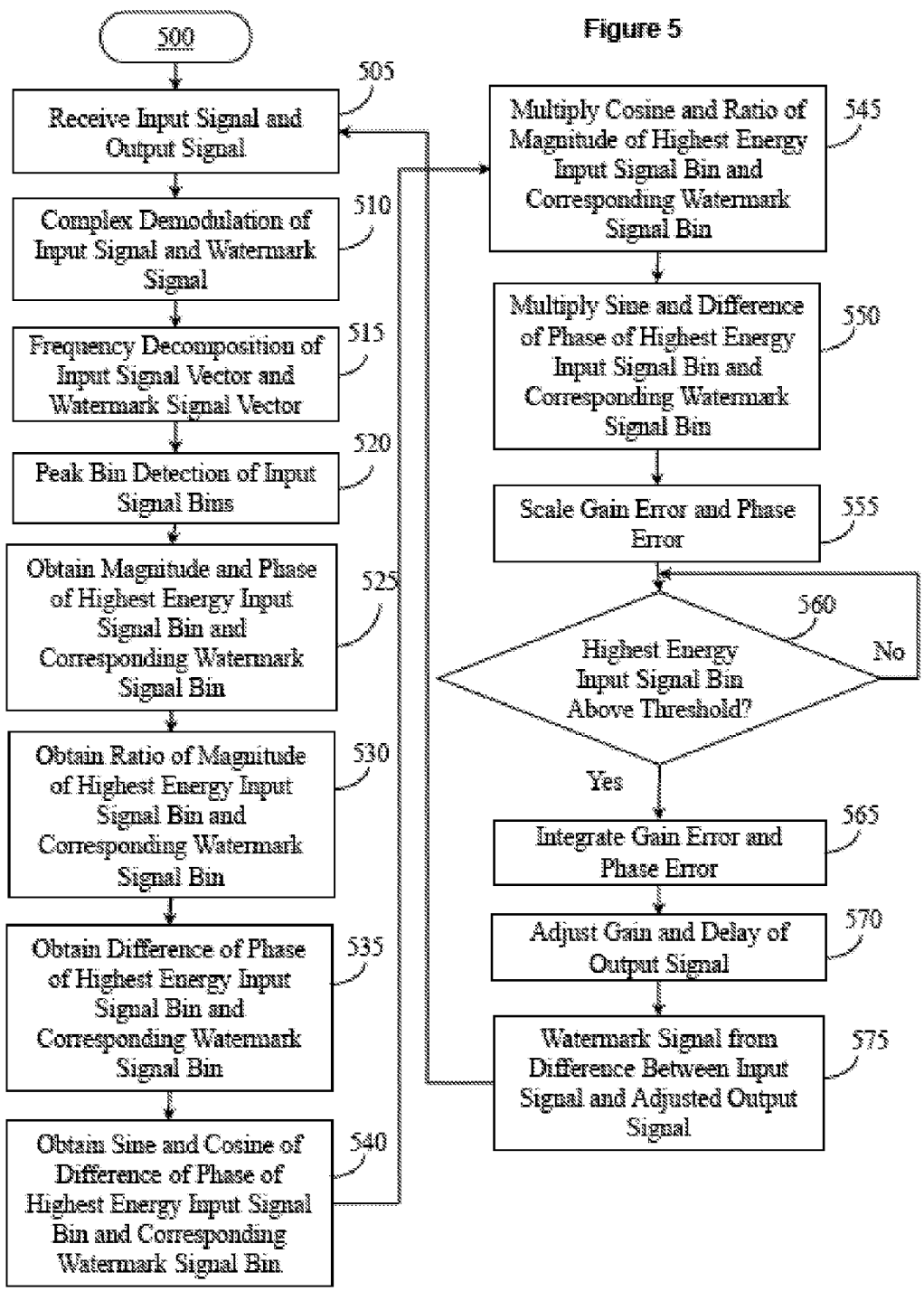
FIG. 5 illustrates a flow diagram for an exemplary method for extracting a watermark signal from an output signal of a watermarking encoder.

FIG. 5 illustrates a flow diagram for an exemplary method 500 for extracting a watermark signal from an output signal of a watermarking encoder. At 505 the method 500 includes receiving the input signal and the output signal. The method 500 generates a gain adjustment signal and a delay adjustment signal based on the input signal and the output signal, produces an adjusted input signal based on the gain adjustment signal and the delay adjustment signal, and obtains the watermark/error signal from a difference between the output signal and the adjusted input signal.

At 510, the method 500 includes performing complex demodulation of the input signal and the watermark/error signal to obtain an input signal vector and a watermark/error signal vector, respectively. At 515, the method 500 performs frequency decomposition of the input signal vector and the watermark/error signal vector to obtain input signal bins and watermark/error signal bins, respectively. At 520, the method 500 performs peak bin detection of the input signal bins to identify a highest energy input signal bin. At 525, the method 500 obtains magnitude and phase of the highest energy input signal bin and magnitude and phase of a watermark/error signal bin corresponding to the highest energy input signal bin.

At 530, the method 500 obtains a ratio of the magnitude of the highest energy input signal bin and the magnitude of the watermark/error signal bin corresponding to the highest energy input signal bin. At 535, the method 500 obtains a difference between the phase of the highest energy input signal bin and the phase of the watermark/error signal bin corresponding to the highest energy input signal bin. At 540, the method 500 obtains sine and cosine of the difference between the phase of the highest energy input signal bin and the phase of the watermark/error signal bin corresponding to the highest energy input signal bin.

At 545, the method 500 multiplies the cosine of the difference between the phase of the highest energy input signal bin and the phase of the watermark/error signal bin corresponding to the highest energy input signal bin times the ratio of the magnitude of the highest energy input signal bin and the magnitude of the watermark/error signal bin corresponding to the highest energy input signal bin to obtain a gain error. At 550, the method 500 multiplies the sine of the difference between the phase of the highest energy input signal bin and the phase of the watermark/error signal bin corresponding to the highest energy input signal bin times the ratio of the magnitude of the highest energy input signal bin and the magnitude of the watermark/error signal bin corresponding to the highest energy input signal bin to obtain a phase error. The method 500 generates the gain adjustment signal and the delay adjustment signal based on the gain error and the phase error, respectively.

At 555, the method 500 scales the gain error and the phase error. At 560, if energy of the highest energy input signal bin is above a threshold, at 565 the method 500 integrates the gain error or a scaled gain error to obtain the gain adjustment signal and the phase error or a scaled phase error to obtain the delay adjustment signal. Back to 560, if energy of the highest energy input signal bin is below the threshold, the method 500 generates the gain adjustment signal as a previous value (i.e., the current value) of the gain adjustment signal and the delay adjustment signal as a previous value (i.e., the current value) of the delay adjustment signal. In one embodiment, the threshold corresponds to the energy of the remaining input signal bins. If the energy of the highest energy input signal bin is larger than the energy of the remaining input signal bins, integration proceeds. If the energy of the highest energy input signal bin is not larger than the energy of the remaining input signal bins, integration is suspended.

At 570, the method 500 adjusts the gain and delay of the input signal based on the gain adjustment signal and the delay adjustment signal, respectively, to obtain the adjusted input signal. At 575, the method 500 obtains the watermark/error signal from a difference between the output signal and the adjusted input signal.

Figure 11:
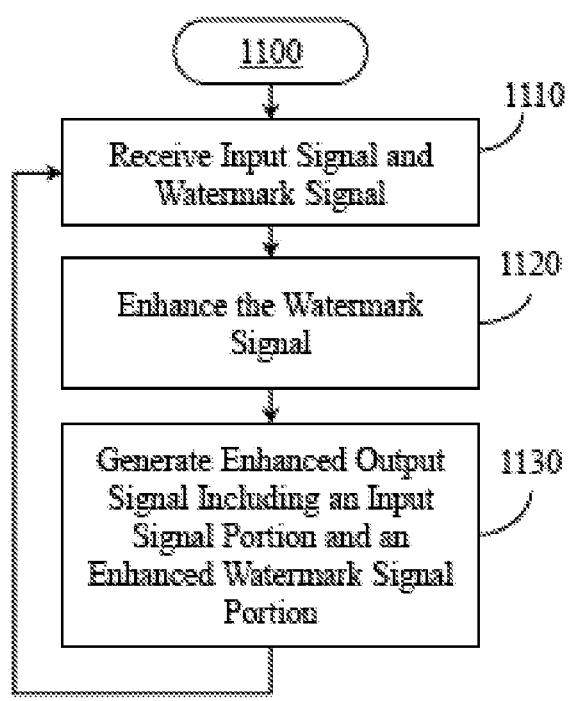
FIG. 11 illustrates a flow diagram for an exemplary method for enhancing a watermark signal extracted from an output signal of a watermarking encoder.

FIG. 11 illustrates a flow diagram for an exemplary method 1100 for enhancing a watermark signal extracted from an output signal of a watermarking encoder. At 1110, the method 1100 includes receiving the input signal and the watermark signal. Further, at 1120, the method 1100 includes enhancing the watermark signal at least in part by adjusting a gain of the watermark signal to obtain an enhanced watermark signal. At 1130, the method 1100 also includes generating an enhanced output signal including an input signal portion corresponding to the input signal and an enhanced watermark signal portion corresponding to the enhanced watermark signal.

Figure 12:
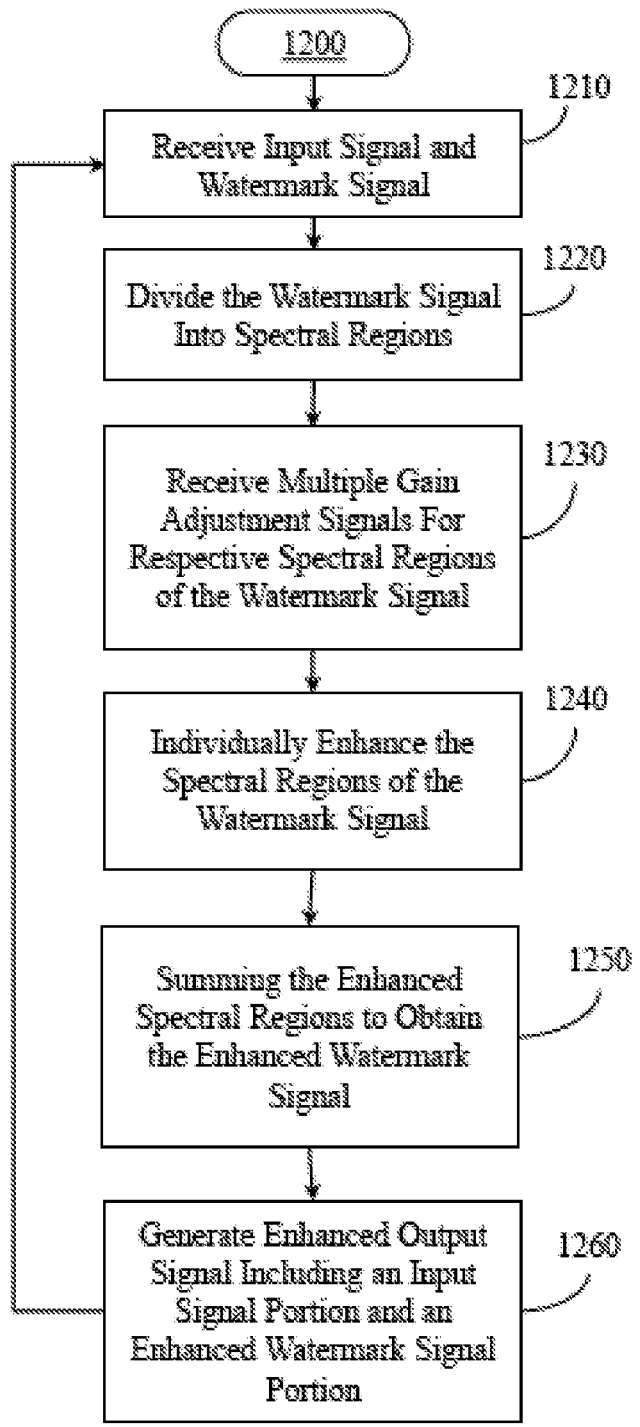
FIG. 12 illustrates a flow diagram for another exemplary method for enhancing a watermark signal extracted from an output signal of a watermarking encoder.

FIG. 12 illustrates a flow diagram for an exemplary method 1200 for enhancing a watermark signal extracted from an output signal of a watermarking encoder. At 1210, the method 1200 includes receiving the input signal and the watermark signal. Further, at 1220, the method 1200 includes dividing the watermark signal into spectral regions. At 1230, the method 1200 includes receiving multiple gain adjustment signals corresponding to gain settings for respective spectral regions of the watermark signal.

At 1240, the method 1200 further includes individually enhancing the spectral regions of the watermark signal at least in part by individually adjusting gains of the spectral regions of the watermark signal based on the received multiple adjustment signals. At 1250, the method 1200 further includes summing the individually enhanced spectral regions to obtain the enhanced watermark signal. At 1260, the method 1200 also includes generating an enhanced output signal including an input signal portion corresponding to the input signal and an enhanced watermark signal portion corresponding to the enhanced watermark signal.

Figure 13:
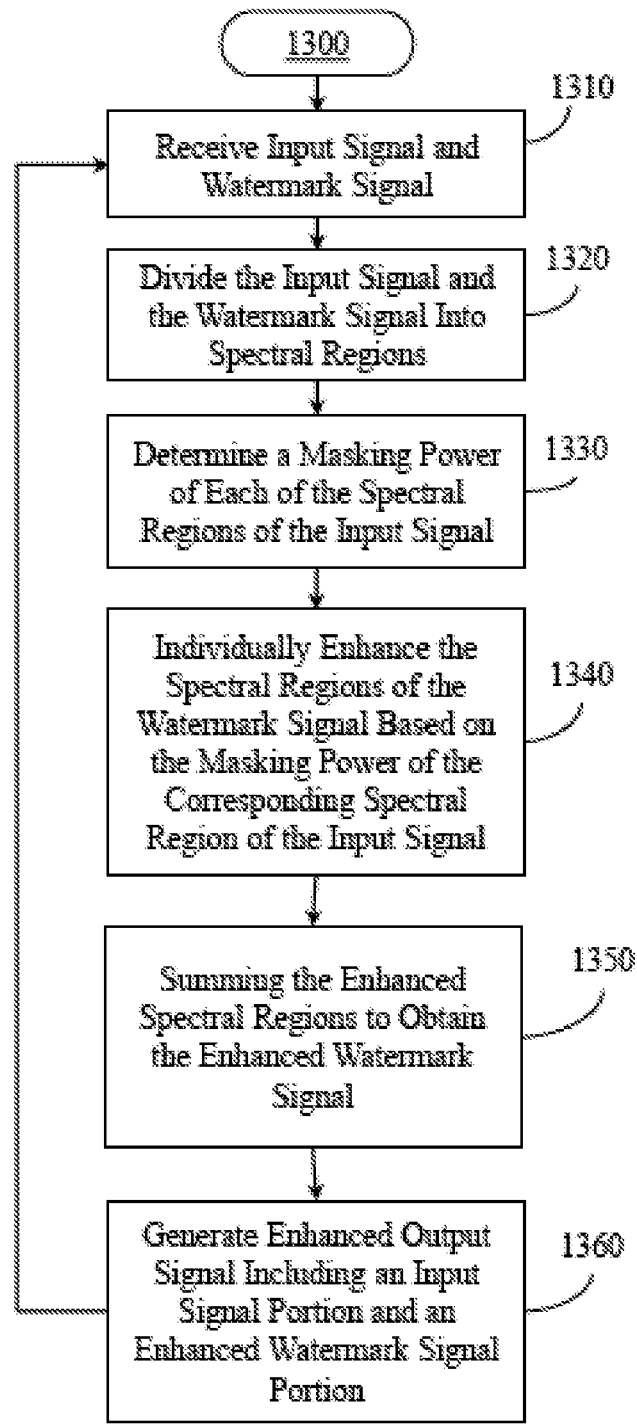
FIG. 13 illustrates a flow diagram for yet another exemplary method for enhancing a watermark signal extracted from an output signal of a watermarking encoder.

FIG. 13 illustrates a flow diagram for an exemplary method 1300 for enhancing a watermark signal extracted from an output signal of a watermarking encoder. At 1310, the method 1300 includes receiving the input signal and the watermark signal. Further, at 1320, the method 1300 includes dividing the input signal and the watermark signal into spectral regions. At 1330, the method 1300 includes determining a masking power of each of the spectral regions of the input signal by, for example, computing at least one of a root mean square (RMS) or a magnitude average of the spectral region and computing a dynamic envelope of the at least one of the root mean square (RMS) or the magnitude average of the spectral region.

At 1340, the method 1300 further includes individually enhancing the spectral regions of the watermark signal at least in part by individually adjusting gain of each spectral region of the watermark signal based on the determined masking power of the corresponding spectral region of the input signal. At 1350, the method 1300 further includes summing the individually enhanced spectral regions to obtain the enhanced watermark signal. At 1360, the method 1300 also includes generating an enhanced output signal including an input signal portion corresponding to the input signal and an enhanced watermark signal portion corresponding to the enhanced watermark signal.

Figure 14:
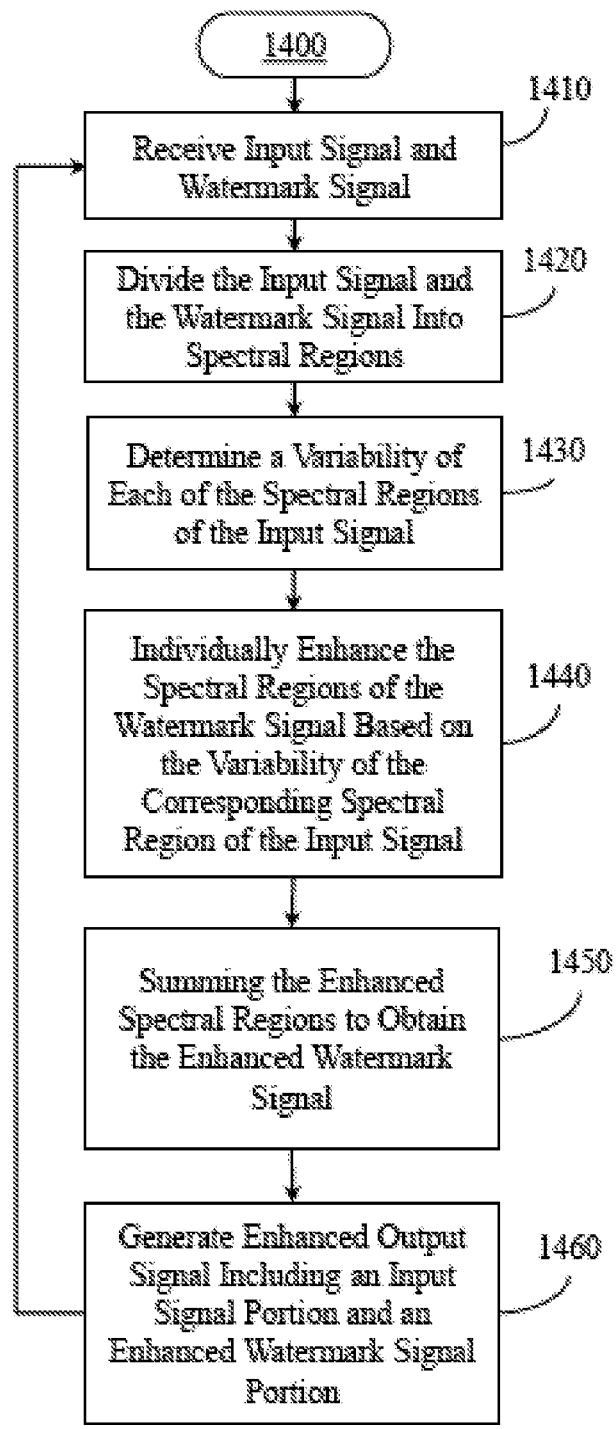
FIG. 14 illustrates a flow diagram for yet another exemplary method for enhancing a watermark signal extracted from an output signal of a watermarking encoder.

FIG. 14 illustrates a flow diagram for an exemplary method 1400 for enhancing a watermark signal extracted from an output signal of a watermarking encoder. At 1410, the method 1400 includes receiving the input signal and the watermark signal. Further, at 1420, the method 1400 includes dividing the input signal and the watermark signal into spectral regions. At 1430, the method 1400 includes determining a variability of each of the spectral regions of the input signal by, for example, determining for each of the spectral regions whether energy is higher than a threshold over a period of time and assigning to each of the spectral regions a variability value (e.g., relative to the other spectral regions) based on how consistently energy of the spectral region is higher than the threshold over the period of time.

At 1440, the method 1400 further includes individually enhancing the spectral regions of the watermark signal at least in part by individually adjusting a gain of each spectral region of the watermark signal based on the determined variability of the respective spectral region of the input signal. At 1450, the method 1400 further includes summing the individually enhanced spectral regions to obtain the enhanced watermark signal. At 1460, the method 1400 also includes generating an enhanced output signal including an input signal portion corresponding to the input signal and an enhanced watermark signal portion corresponding to the enhanced watermark signal.

Figure 20:
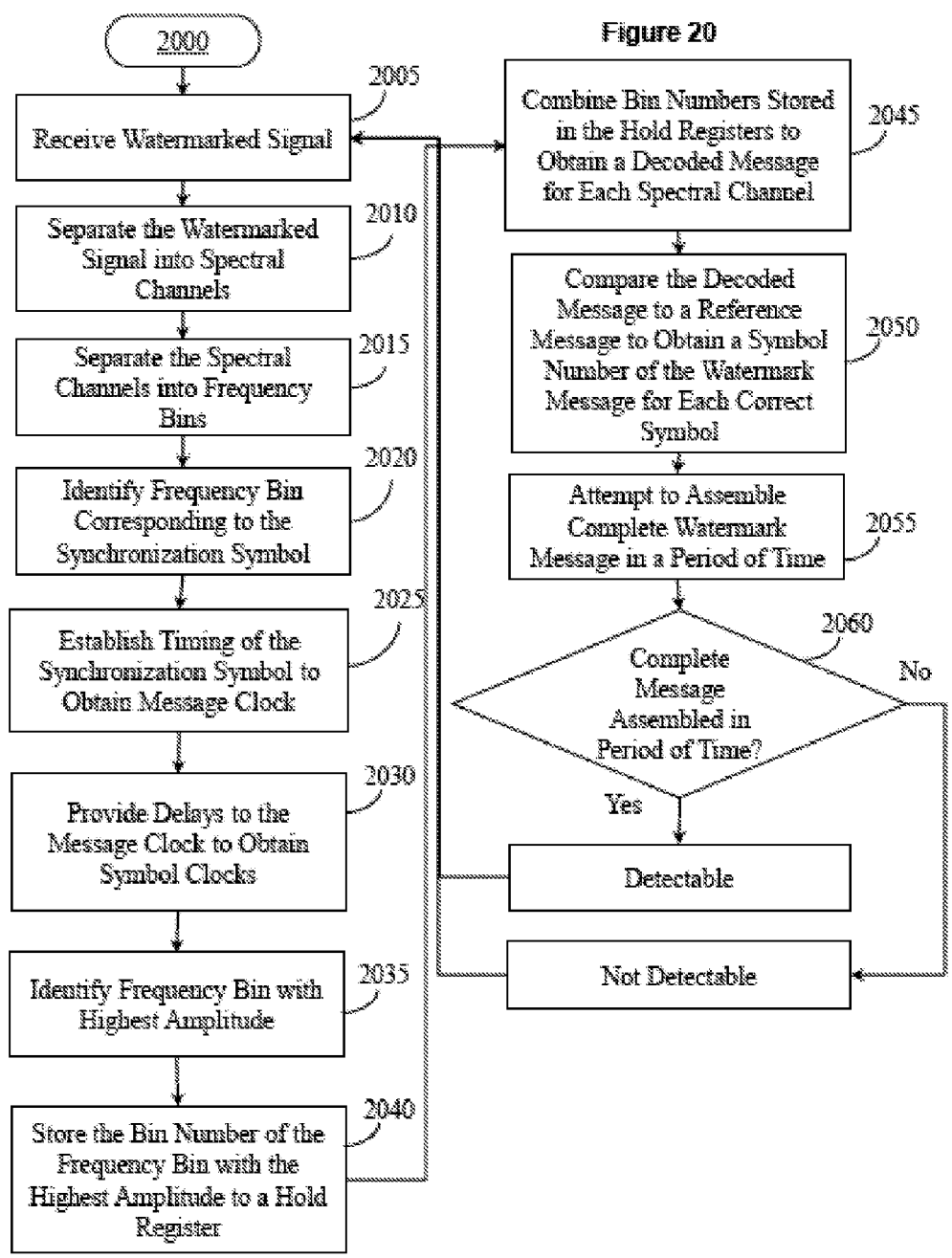
FIG. 20 illustrates a flow diagram for an exemplary method for monitoring detectability of a watermark message.

FIG. 20 illustrates a flow diagram for an exemplary method 2000 for monitoring detectability of a watermark message produced by a watermarking encoder. At 2005, the method 2000 includes receiving a watermarked signal in which the watermark message is embedded. At 2010, the method 2000 includes separating the watermarked signal into spectral channels.

In one embodiment, the watermarked signal is separated into the spectral channels by a) spectrally shifting the watermarked signal such that a center frequency of the spectral channel shifts to 0 Hz, and b) low pass filtering the spectrally shifted watermarked signal to obtain the spectral channel.

At 2015, the method 2000 separates the spectral channels into frequency bins. At 2020, the method includes identifying for each of the spectral channels a frequency bin corresponding to the synchronization symbol of the watermark message. At 2025, the method 2000 includes establishing a timing of the synchronization symbol based on an aggregate of the frequency bins corresponding to the synchronization symbol identified for the spectral channels to obtain a message clock. At 2030, the method 2000 includes providing delays to the message clock to establish timing for symbols in the watermark message other than the synchronization symbol. At

2035, for each of the symbols in the watermark message other than the synchronization symbol, at a timing corresponding to the timing for each symbol, for each of the spectral channels, the method 2000 includes identifying a frequency bin with the highest amplitude. At 2040, the method includes storing the bin number of the frequency bin with the highest amplitude to a respective hold register of a plurality of hold registers.

At 2045, the method 2000 combines the bin numbers stored in the hold registers to obtain a decoded message for each spectral channel. At 2050, the method 2000 includes, for each of the spectral channels, comparing the decoded message to a reference message to obtain a symbol number of the watermark message for each correct symbol in the decoded message. At 2055, the method 2000 includes attempting to assemble a complete watermark message in a predetermined period of time by combining symbol numbers of the watermark message from the spectral channels. If the complete watermark message is assembled in the predetermined period of time, at 2060, the method 2000 includes establishing the detectability measure of the watermark message embedded in the watermarked signal as detectable or not detectable.

Figure 29:
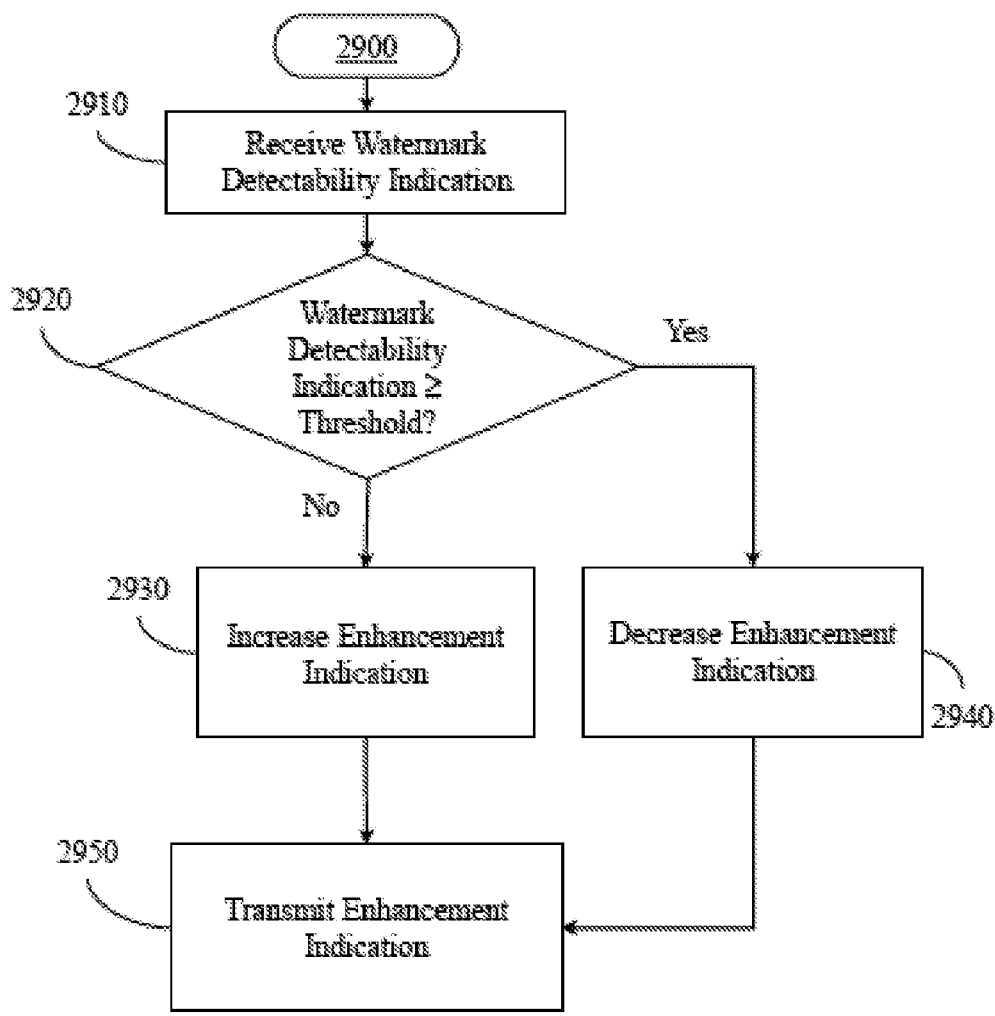
FIG. 29 illustrates a flow diagram for an exemplary method for providing feedback regarding detectability of a watermark message produced by a watermarking encoder.

FIG. 29 illustrates a flow diagram for an exemplary method 2900 for providing feedback regarding detectability of a watermark message produced by a watermarking encoder. At 2910, the method 2900 includes receiving a watermark detectability indication corresponding to detectability of the watermark message. The method 2900 determines an enhancement indication corresponding to a prescribed enhancement to a watermark signal in which the watermark message is embedded based on the watermark detectability indication. In the illustrated embodiment, the method 2900, at 2920, determines the enhancement indication by comparing the watermark detectability indication to a threshold. If the watermark detectability indication is lower than the threshold, at 2930, the enhancement indication is increased. However, if the watermark detectability indication is higher than the threshold, at 2940, the enhancement indication is increased. At 2950, the method 2900 transmits the determined enhancement indication.

In one embodiment, the increase or decrease of the enhancement indication is proportional (e.g., linear, exponential, etc.) to the difference between the watermark detectability indication and the threshold. In another embodiment, the increase or decrease of the enhancement indication corresponds to a prescribed change in the enhancement to the watermark signal (fixed percentage, fixed step, maximum enhancement that would not cause the watermark signal to be audible, etc.)

Figure 30:
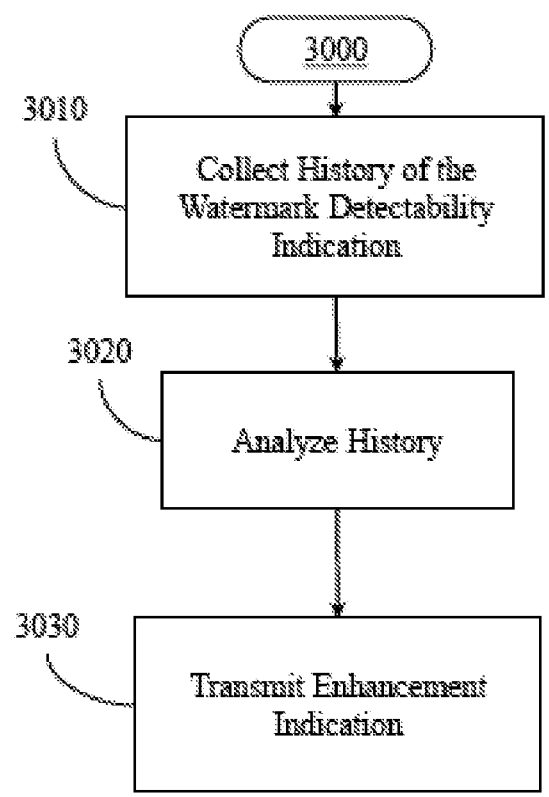
FIG. 30 illustrates a flow diagram for another exemplary method for providing feedback regarding detectability of a watermark message produced by a watermarking encoder.

FIG. 30 illustrates a flow diagram for an exemplary method 3000 for providing feedback regarding detectability of a watermark message produced by a watermarking encoder. At 3010, the method 3000 includes collecting a history of the watermark detectability indication corresponding to a plurality of time intervals. At 3020, the method 3000 analyzes the history of the watermark detectability indication to, for example, predict patterns of detectability. At 3030, the method 3000 determines the enhancement indication based on the analysis of the history of the watermark detectability indication such as, for example, a predicted pattern of detectability.

Figure 31:
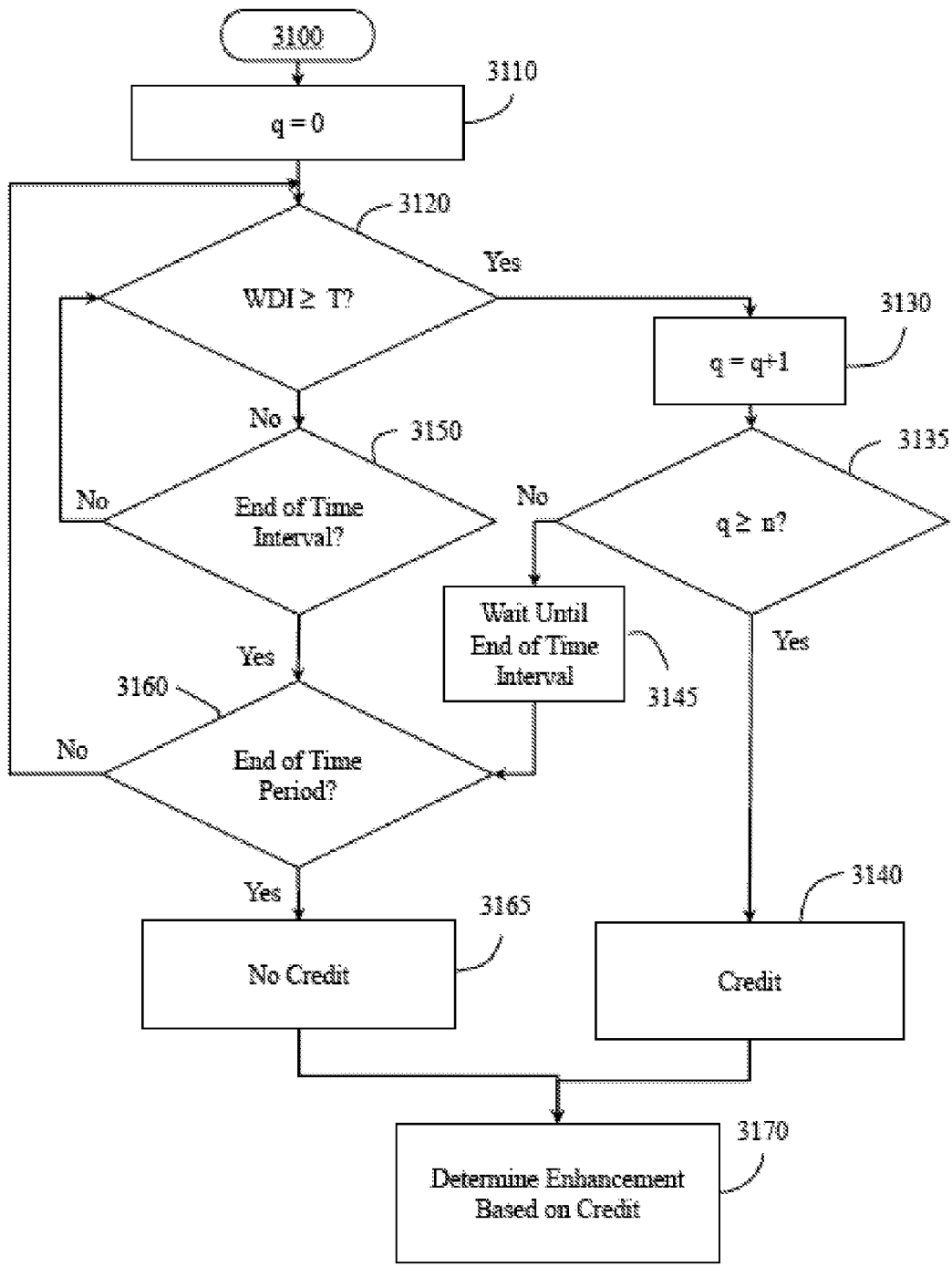
FIG. 31 illustrates a flow diagram for another exemplary method for providing feedback regarding detectability of a watermark message produced by a watermarking encoder.

FIG. 31 illustrates a flow diagram for an exemplary method 3100 for providing feedback regarding detectability of a watermark message produced by a watermarking encoder. At 3110, the method 3100 includes resetting a number of times q that the watermark detectability indication equals or exceeds a threshold T in a time period. At 3120, the method 3100 compares the watermark detectability indication WDI to a threshold T. If the watermark detectability indication WDI is equal or larger than the threshold T, at 3130 the number of time internals q that the watermark detectability indication equals or exceeds the threshold in the time period is increased (i.e., the time interval is credited). At 3135, if the number of credited time intervals q equals or exceeds a number of intervals n for which the watermark detectability indication needs to equal or exceed the threshold in the time period, at 3140, the time period is credited.

Back to 3135, if the number of credited time intervals q is less than the number of intervals n for which the watermark detectability indication needs to equal or exceed the threshold in the time period, at 3145, the method 3100 waits until the end of the time interval and then proceeds to 3160. At 3160 the method 3100 determines whether it is the end of the time period. If it is not the end of the time period, the method 3100 returns to 3120 to compare the watermark detectability indication WDI to a threshold T for the next interval. Back to 3160, if it is the end of the time period, at 3165, the time period is not credited.

Back to 3120, if the watermark detectability indication WDI is less than the threshold T, at 3150, the method 3100 determines whether it is the end of the time interval. If it is not the end of the time interval, the method 3100 returns to 3120 to compare the watermark detectability indication WDI to a threshold T for the current time interval. Back to 3150, if it is the end of the time interval, at 3160 the method 3100 determines whether it is the end of the time period. If it is not the end of the time period, the method 3100 returns to 3120 to compare the watermark detectability indication WDI to a threshold T for the next interval. Back to 3160, if it is the end of the time period, at 3165, the time period is not credited.

At 3170, the method 3100 determines the enhancement indication based on whether detection of the watermark has been credited.

In one embodiment, during the time period, the method 3100 increases a level of the prescribed enhancement to the watermark signal in the enhancement indication if the determined number of times q that the watermark detectability indication WDI has exceeded the threshold T at a point in time during the time period is less than the product of the predetermined number of times n multiplied by the quotient of the point in time divided by the time period.

In addition or in another embodiment, during the time period, the method 3100 decreases the level of the prescribed enhancement to the watermark signal in the enhancement indication if the determined number of times q that the watermark detectability indication WDI has exceeded the threshold T at a point in time during the time period is higher than the product of the predetermined number of times n multiplied by the quotient of the point in time divided by the time period.

Figure 32:
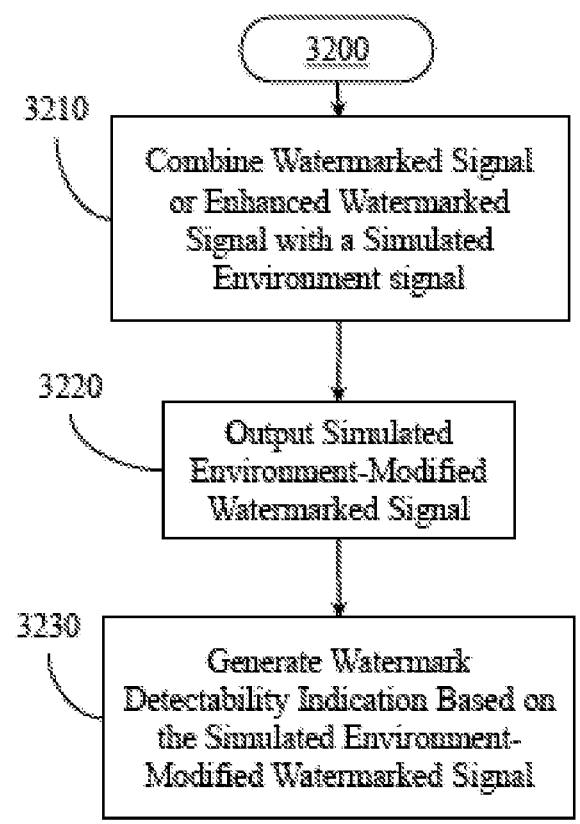
FIG. 32 illustrates a flow diagram for another exemplary method for providing feedback regarding detectability of a watermark message produced by a watermarking encoder.

FIG. 32 illustrates a flow diagram for an exemplary method 3200 for providing feedback regarding detectability of a watermark message produced by a watermarking encoder. At 3210, the method 3200 includes combining the at least one of a watermarked signal or an enhanced watermarked signal with a simulated environment signal that corresponds to an expected listening environment of the at least one of the watermarked signal or the enhanced watermarked signal. At 3230, the method includes outputting a simulated environment-modified watermarked signal corresponding to the combination of the at least one of the watermarked signal or the enhanced watermarked signal with the simulated environment signal. At 3230, the method 3200 also includes generating a watermark detectability indication based on the simulated environment-modified watermarked signal.

While FIGS. 5, 11-15, 20 and 29-32 illustrate various actions occurring in serial, it is to be appreciated that various actions illustrated could occur substantially in parallel, and while actions may be shown occurring in parallel, it is to be appreciated that these actions could occur substantially in series. While a number of processes are described in relation to the illustrated methods, it is to be appreciated that a greater or lesser number of processes could be employed and that lightweight processes, regular processes, threads, and other approaches could be employed. It is to be appreciated that other exemplary methods may, in some cases, also include actions that occur substantially in parallel. The illustrated exemplary methods and other embodiments may operate in real-time, faster than real-time in a software or hardware or hybrid software/hardware implementation, or slower than real time in a software or hardware or hybrid software/hardware implementation.

Figure 6:
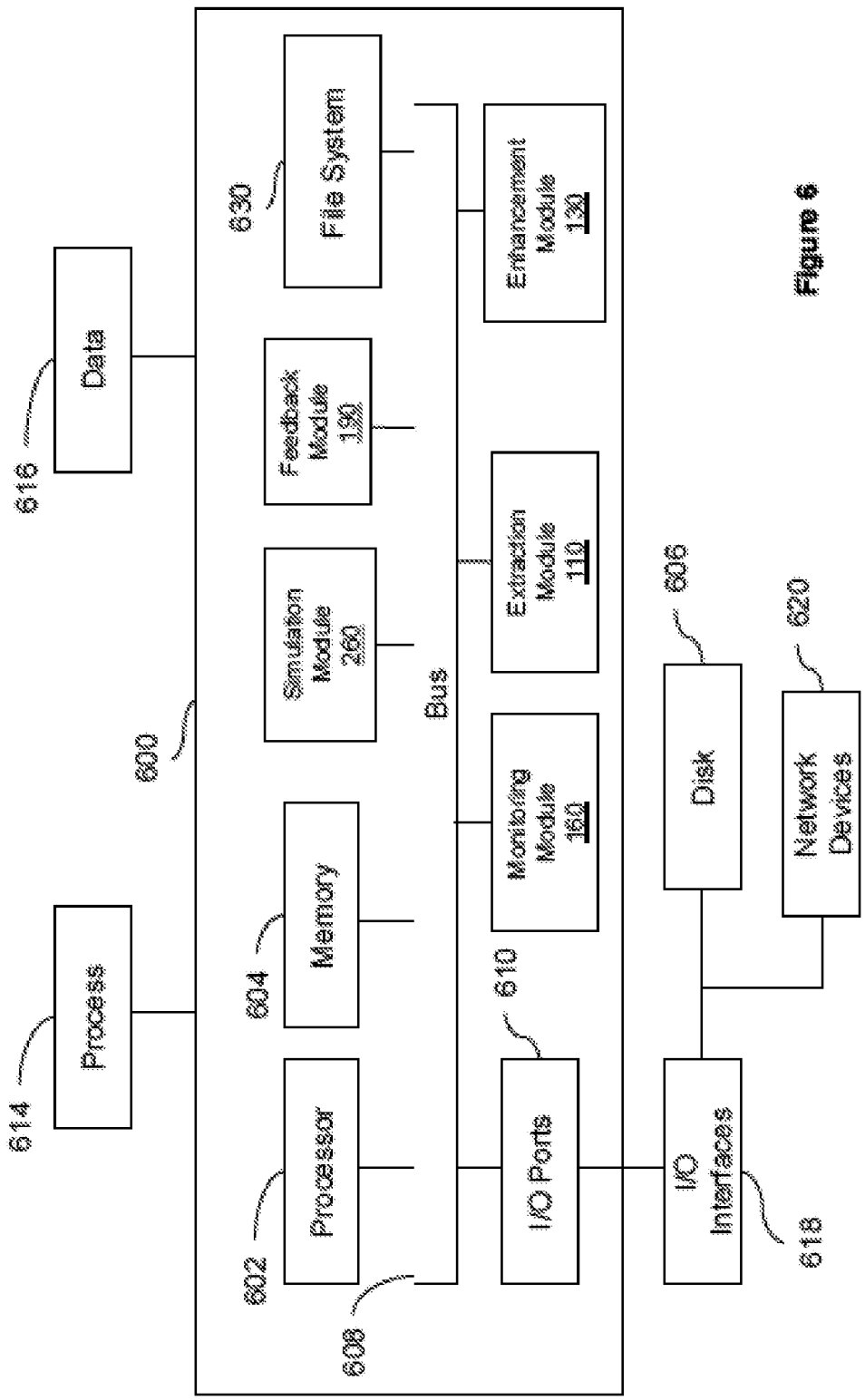
FIG. 6 illustrates a block diagram of an exemplary device for extracting a watermark signal from an output signal of a watermarking encoder.

FIG. 6 illustrates a block diagram of an exemplary device 600 for extracting a watermark signal from an output signal of a watermarking encoder, for enhancing the watermark signal extracted from the output signal of the watermarking encoder, and for monitoring detectability of a watermark message embedded in the watermark signal. The device 600 includes a processor 602, a memory 604, and I/O Ports 610 operably connected by a bus 608.

In one example, the device 600 may include an extraction module 110 that generates a gain adjustment signal and a delay adjustment signal based on the input signal and the output signal, adjusts gain and delay of the input signal based on the gain adjustment signal and the delay adjustment signal, respectively, to generate an adjusted input signal. The extraction module 110 may also obtain the watermark signal from a difference between the input signal and the adjusted output signal or from a difference between the adjusted input signal and the output signal. Thus, the extraction module 110 may be implemented in device 600 as hardware, firmware, software, or a combination thereof and may provide means for generating a gain adjustment signal and a delay adjustment signal, for adjusting gain and delay of the input signal based on the gain adjustment signal and the delay adjustment signal, respectively, to generate an adjusted input signal and for obtaining the watermark signal from a difference between the input signal and the adjusted output signal or from a difference between the adjusted input signal and the output signal. The extraction module 110 may be permanently or removably attached to the device 600.

In another example, the device 600 may include an enhancement module 130 that enhances the watermark signal at least in part by adjusting a gain of the watermark signal to obtain an enhanced watermark signal, and generates an enhanced output signal including an input signal portion corresponding to the input signal and an enhanced watermark signal portion corresponding to the enhanced watermark signal. Thus, the enhancement module 130, whether implemented in device 600 as hardware, firmware, software, or a combination thereof may provide means for enhancing the watermark signal at least in part by adjusting a gain of the watermark signal to obtain an enhanced watermark signal, and for generating an enhanced output signal including an input signal portion corresponding to the input signal and an enhanced watermark signal portion corresponding to the enhanced watermark signal. The enhancement module 130 may be permanently or removably attached to the device 600.

In yet another example, the device 600 may include a monitoring module 160 that monitors detectability of a watermark message embedded in the watermark signal. Thus, the monitoring module 160, whether implemented in device 600 as hardware, firmware, software, or a combination thereof may provide means for monitoring detectability of a watermark message at least in part by receiving a watermarked signal in which the watermark message is embedded, separating the watermarked signal into spectral channels, separating the spectral channels into frequency bins, identifying for each of the spectral channels a frequency bin corresponding to a symbol that appears in a plurality of the spectral channels, and establishing a detectability measure of the watermark message embedded in the watermarked signal based at least in part on the frequency bin corresponding to the symbol that appears in the plurality of the spectral channels. The monitoring module 160 may be permanently or removably attached to the device 600.

In yet another example, the device 600 may include a feedback module 190 that receives a watermark detectability indication and determines an enhancement indication corresponding to a prescribed enhancement to a watermark signal in which the watermark message is embedded. Thus, the feedback module 190, whether implemented in device 600 as hardware, firmware, software, or a combination thereof may provide means for determining an enhancement indication corresponding to a prescribed enhancement to a watermark signal in which the watermark message is embedded based on the watermark detectability indication. The feedback module 190 may be permanently or removably attached to the device 600.

In yet another example, the device 600 may include a simulation module 260 that combines at least one of a watermarked signal or an enhanced watermarked signal with a simulated environment signal that corresponds to an expected listening environment of the at least one of the watermarked signal or the enhanced watermarked signal, and outputs a simulated environment-modified watermarked signal corresponding to the combination of the at least one of the watermarked signal or the enhanced watermarked signal with the simulated environment signal. Thus, the simulation module 260, whether implemented in device 600 as hardware, firmware, software, or a combination thereof may provide means for combining the at least one of the watermarked signal or the enhanced watermarked signal with a simulated environment signal that corresponds to an expected listening environment of the at least one of the watermarked signal or the enhanced watermarked signal, and outputting a simulated environment-modified watermarked signal corresponding to the combination of the at least one of the watermarked signal or the enhanced watermarked signal with the simulated environment signal. The simulation module 260 may be permanently or removably attached to the device 600.

The processor 602 can be a variety of various processors including dual microprocessor and other multi-processor architectures. The memory 604 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 606 may be operably connected to the device 600 via, for example, an I/O Interfaces (e.g., card, device) 618 and an I/O Ports 610. The disk 606 can include, but is not limited to, devices like a magnetic disk drive, a solid state disk drive, a floppy disk drive, a tape drive, a Zip drive, a flash memory card, or a memory stick. Furthermore, the disk 606 can include optical drives like a CD-ROM, a CD recordable drive (CD-R drive), a CD rewriteable drive (CD-RW drive), or a digital video ROM drive (DVD ROM). The memory 604 can store processes 614 or data 616, for example. The disk 606 or memory 604 can store an operating system that controls and allocates resources of the device 600.

The bus 608 can be a single internal bus interconnect architecture or other bus or mesh architectures. While a single bus is illustrated, it is to be appreciated that device 600 may communicate with various devices, logics, and peripherals using other busses that are not illustrated (e.g., PCIE, SATA, Infiniband, 1394, USB, Ethernet). The bus 608 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The device 600 may interact with input/output devices via I/O Interfaces 618 and I/O Ports 610. Input/output devices can include, but are not limited to, a keyboard, a microphone, a pointing and selection device, cameras, video cards, displays, disk 606, network devices 620, and the like. The I/O Ports 610 can include but are not limited to, serial ports, parallel ports, and USB ports.

The device 600 can operate in a network environment and thus may be connected to network devices 620 via the I/O Interfaces 618, or the I/O Ports 610. Through the network devices 620, the device 600 may interact with a network. Through the network, the device 600 may be logically connected to remote computers. The networks with which the device 600 may interact include, but are not limited to, a local area network (LAN), a wide area network (WAN), and other networks. The network devices 620 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 620 can connect to WAN technologies including, but not limited to, point to point links, circuit switching networks like integrated services digital networks (ISDN), packet switching networks, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

"Data store," as used herein, refers to a physical or logical entity that can store data. A data store may be, for example, a database, a table, a file, a list, a queue, a heap, a memory, a register, and so on. A data store may reside in one logical or physical entity or may be distributed between two or more logical or physical entities.

"Logic," as used herein, includes but is not limited to hardware, firmware, software or combinations of each to perform a function(s) or an action(s), or to cause a function or action from another logic, method, or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted, or detected.

"Software," as used herein, includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in serial, parallel, massively parallel and other manners.

Suitable software for implementing the various components of the example systems and methods described herein may be produced using programming languages and tools like Java, Pascal, C#, C++, C, CGI, Perl, SQL, APIs, SDKs, assembly, firmware, microcode, or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User," as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

The invention claimed is:

1. A method for a machine or group of machines to provide feedback regarding potential detectability by a decoder of a watermark message produced by a watermarking encoder, the method comprising:

extracting a watermark signal embedded within an output signal of the watermarking encoder, the extracted watermark signal including the watermark message;

enhancing the extracted watermark signal into an enhanced watermark signal;

adding the enhanced watermark signal to an audio signal;

receiving a watermark detectability indication corresponding to detectability of the watermark message in the enhanced watermark signal added to the audio signal;

transforming the watermark detectability indication into an enhancement indication corresponding to a prescribed enhancement to the extracted watermark signal in which the watermark message is included, wherein the transforming the watermark detectability indication into the enhancement indication includes:

comparing the watermark detectability indication to a threshold, determining a number of times that the watermark detectability indication equals or exceeds the threshold, crediting detection of the watermark message for a time period when the determined number of times that the watermark detectability indication equals or exceeds the threshold equals or exceeds a predetermined number in the time period, determining the enhancement indication based on whether detection of the watermark has been credited; and transmitting the enhancement indication such that the enhancing of the extracted watermark signal is based on the enhancement indication.

2. The method of claim 1, wherein the transforming the watermark detectability indication into the enhancement indication includes:

when the detection of the watermark message is not credited for the time period, setting the enhancement indication to correspond to a prescribed increased enhancement to the watermark signal; or when the detection of the watermark message is credited for the time period, setting the enhancement indication to correspond to a prescribed decreased enhancement to the watermark signal.

3. The method of claim 1, wherein the transforming the watermark detectability indication into the enhancement indication includes:

during the time period, at least one of:

increasing a level of the prescribed enhancement to the watermark signal in the enhancement indication when the determined number of times that the watermark detectability indication has exceeded the threshold at a point in time during the time period is less than the product of the predetermined number of times multiplied by the quotient of the point in time divided by the time period, or decreasing the level of the prescribed enhancement to the watermark signal in the enhancement indication when the determined number of times that the watermark detectability indication has exceeded the threshold at a point in time during the time period is higher than the product of the predetermined number of times multiplied by the quotient of the point in time divided by the time period.

4. The method of claim 1, wherein the transforming the watermark detectability indication into the enhancement indication the enhancement indication includes:

receiving an electronic signal including scheduling data representing at least one of playout automation information or broadcast traffic information including at least timing and content type information of content; and determining the enhancement indication based on the timing and content type information of content and on the watermark detectability indication.

5. The method of claim 1, wherein the transforming the watermark detectability indication into the enhancement indication includes:

collecting a history of the watermark detectability indication corresponding to a plurality of time intervals; and
selecting a prescribed enhancement for the enhancement indication from a predetermined set of prescribed enhancements based on the history of the watermark detectability indication.

6. The method of claim 1, wherein the transforming the watermark detectability indication into the enhancement indication includes:
collecting a history of the watermark detectability indication corresponding to a plurality of time intervals;
conducting analysis of the history of the watermark detectability indication; and
determining the enhancement indication based on the analysis of the history of the watermark detectability indication.

7. The method of claim 1, wherein the transforming the watermark detectability indication into the enhancement indication includes:
collecting a history of the watermark detectability indication corresponding to a plurality of time intervals;
conducting analysis of the history of the watermark detectability indication to predict patterns of detectability; and
determining the enhancement indication based on the analysis of the history of the watermark detectability indication and the predicted patterns of detectability.

8. The method of claim 1, wherein the transforming the watermark detectability indication into the enhancement indication includes:
collecting a history of the watermark detectability indication corresponding to a plurality of time intervals; and at least one of:
determining the enhancement indication based on the history of the watermark detectability indication,
selecting a prescribed enhancement for the enhancement indication from a predetermined set of prescribed enhancements based on the history of the watermark detectability indication,
determining the enhancement indication based on analysis of the history of the watermark detectability indication, and
determining the enhancement indication based on patterns of detectability predicted based on analysis of the history of the watermark detectability indication.

9. A machine or group of machines embodying a system for providing feedback regarding potential detectability by a decoder of a watermark message produced by a watermarking encoder, the system comprising:
an extraction module configured to extract a watermark signal embedded within an output signal of the watermarking encoder, the extracted watermark signal including the watermark message;
an enhancement module configured to enhance the extracted watermark signal into an enhanced watermark signal and to add the enhanced watermark signal to an audio signal;
a feedback module configured to receive a watermark detectability indication corresponding to detectability of the watermark message in the enhanced watermark signal added to the audio signal, and to transform the watermark detectability indication into an enhancement indication corresponding to a prescribed enhancement to the extracted watermark signal, wherein the feedback module is configured to compare the watermark detectability indication to a threshold, determine a number of times that the watermark detectability indication equals or exceeds the threshold, credit detection of the watermark message for a time period when the determined number of times that the watermark detectability indication equals or exceeds the threshold equals or exceeds a predetermined number in the time period, and determine the enhancement indication based on whether detection of the watermark has been credited; and
the enhancement module is configured to receive the enhancement indication and enhance the extracted watermark signal based on the enhancement indication thereby enhancing detectability of the watermark message.

10. The system of claim 9, wherein the feedback module is configured to set the enhancement indication to correspond to a prescribed increased enhancement to the watermark signal when the detection of the watermark message is not credited for the time period, or set the enhancement indication to correspond to a prescribed decreased enhancement to the watermark signal when the detection of the watermark message is credited for the time period.

11. The system of claim 9, wherein the feedback module is configured to
during the time period, at least one of:
increasing a level of the prescribed enhancement to the watermark signal in the enhancement indication when the determined number of times that the watermark detectability indication has exceeded the threshold at a point in time during the time period is less than the product of the predetermined number of times multiplied by the quotient of the point in time divided by the time period, or
decreasing the level of the prescribed enhancement to the watermark signal in the enhancement indication when the determined number of times that the watermark detectability indication has exceeded the threshold at a point in time during the time period is higher than the product of the predetermined number of times multiplied by the quotient of the point in time divided by the time period.

12. The system of claim 9, wherein the feedback module is configured to collect a history of the watermark detectability indication corresponding to a plurality of time intervals and select a prescribed enhancement for the enhancement indication from a predetermined set of prescribed enhancements based on the history of the watermark detectability indication.

13. The system of claim 9, wherein the feedback module is configured to collect a history of the watermark detectability indication corresponding to a plurality of time intervals, conduct analysis of the history of the watermark detectability indication, and determine the enhancement indication based on the analysis of the history of the watermark detectability indication.

14. The system of claim 9, wherein the feedback module is configured to collect a history of the watermark detectability indication corresponding to a plurality of time intervals, conduct analysis of the history of the watermark detectability indication to predict patterns of detectability, and determine the enhancement indication based on the analysis of the history of the watermark detectability indication and the predicted patterns of detectability.

15. The system of claim 9, wherein the feedback module is configured to:
collect a history of the watermark detectability indication corresponding to a plurality of time intervals; and at least one of:
determine the enhancement indication based on the history of the watermark detectability indication, select a prescribed enhancement for the enhancement indication from a predetermined set of prescribed enhancements based on the history of the watermark detectability indication, determine the enhancement indication based on analysis of the history of the watermark detectability indication, and determine the enhancement indication based on patterns of detectability predicted based on analysis of the history of the watermark detectability indication.

16. The system of claim 9, wherein the feedback module is configured to receive an electronic signal including scheduling data representing at least one of playout automation information or broadcast traffic information including at least timing and content type information of content, and determine the enhancement indication based on the timing and content type information of content and on the watermark detectability indication.

* * * * *